US010392463B2

(12) United States Patent
Kitayama et al.

(10) Patent No.: US 10,392,463 B2
(45) Date of Patent: Aug. 27, 2019

(54) ACRYLIC RESIN COMPOSITION, AND MOLDED PRODUCT AND FILM MADE FROM SAME

(71) Applicant: Kaneka Corporation, Osaka (JP)

(72) Inventors: Fuminobu Kitayama, Hyogo (JP); Nobuyoshi Maizuru, Hyogo (JP); Mitsuru Nakamura, Hyogo (JP); Haruki Koyama, Osaka (JP)

(73) Assignee: KANEKA CORPORATION, Osaka (JP)

( * ) Notice: Subject to any disclaimer, the term of this patent is extended or adjusted under 35 U.S.C. 154(b) by 50 days.

(21) Appl. No.: 15/694,154

(22) Filed: Sep. 1, 2017

(65) Prior Publication Data

US 2017/0362368 A1 Dec. 21, 2017

Related U.S. Application Data

(63) Continuation of application No. PCT/JP2016/001093, filed on Mar. 1, 2016.

(30) Foreign Application Priority Data

Mar. 2, 2015 (JP) ................................ 2015-040810
Mar. 2, 2015 (JP) ................................ 2015-040811
Mar. 2, 2015 (JP) ................................ 2015-040812
Sep. 28, 2015 (JP) ................................ 2015-190382
Sep. 28, 2015 (JP) ................................ 2015-190383
Sep. 28, 2015 (JP) ................................ 2015-190384

(51) Int. Cl.
*C08F 265/06* (2006.01)
*C08L 51/00* (2006.01)
*C08L 33/08* (2006.01)
*C08F 2/38* (2006.01)

(52) U.S. Cl.
CPC .............. *C08F 265/06* (2013.01); *C08F 2/38* (2013.01); *C08L 33/08* (2013.01); *C08L 51/00* (2013.01); *C08L 2201/10* (2013.01); *C08L 2203/16* (2013.01)

(58) Field of Classification Search
CPC ............................... C08F 265/06; C08L 33/08
USPC .......................................................... 428/522
See application file for complete search history.

(56) References Cited

U.S. PATENT DOCUMENTS 3,793,402 A * 2/1974 Owens .................. C08F 285/00 525/81
6,218,447 B1 * 4/2001 Sugaya ................. C08F 285/00 523/201
2008/0073624 A1 * 3/2008 Choi ..................... C08F 279/02 252/582
2014/0045995 A1 2/2014 Shimamoto et al.
2015/0147550 A1 5/2015 Kitayama et al.

FOREIGN PATENT DOCUMENTS

JP S5527576 B2 7/1980
JP H05-140410 A 6/1993
JP H5320457 A 12/1993
JP H06-179793 A 6/1994
JP 09157476 A * 6/1997
JP H9157476 A 6/1997
JP 3960631 B2 8/2007
JP 2009-30001 2/2009
JP 2012-052023 3/2012
WO 1999/055779 A1 11/1999
WO 2014002491 A1 1/2014

OTHER PUBLICATIONS

Extended European Search Report issued in European Application No. 16758625.4; dated Aug. 21, 2018 (14 pages).
International Search Report issued in International Application No. PCT/JP2016/001093; dated May 24, 2016 (2 pages).

* cited by examiner

*Primary Examiner* — Hui H Chin
(74) *Attorney, Agent, or Firm* — Osha Liang LLP

(57) ABSTRACT

A resin composition includes an acrylic resin and a graft copolymer having a gel content of 65% to 84%, wherein the graft copolymer is a multistage-polymerized graft copolymer obtained by a multistage polymerization including the polymerization stages (I) to (III). In the polymerization stage (I), a first monomer mixture and a polyfunctional monomer are polymerized in a presence of a primary alkyl mercaptan-based chain transfer agent and/or a secondary alkyl mercaptan-based chain transfer agent to obtain a first hard polymer. In the polymerization stage (II), a second monomer mixture and a polyfunctional monomer are polymerized to obtain a soft polymer. In the polymerization stage (III), a third monomer mixture and a polyfunctional monomer are polymerized to obtain a second hard polymer.

19 Claims, No Drawings

ACRYLIC RESIN COMPOSITION, AND MOLDED PRODUCT AND FILM MADE FROM SAME

TECHNICAL FIELD

One or more embodiments of the present invention relate to a resin composition containing an acrylic resin and a graft copolymer, and a molded article and a film thereof.

BACKGROUND

Acrylic resins are excellent polymers used in large amounts in various industrial fields for their excellent transparency, color, appearance, weather resistance, luster, and processability. Particularly, films formed by molding acrylic resins are used for various purposes, such as internal and exterior materials for cars, exterior materials for electric devices such as mobile phones and smartphones, and interior and exterior building materials such as floor materials, by taking advantage of their excellent transparency, appearance, and weather resistance. Particularly, in recent years, acrylic resins have been used for optical members of liquid crystal displays, organic EL displays, and the like by taking advantage of their excellent optical properties.

However, an essential disadvantage of acrylic resins is their poor impact resistance. As general methods for improving the impact resistance of an acrylic resin, various methods have been proposed in which a graft copolymer having a rubber layer (rubber-containing graft copolymer) is added to an acrylic resin to develop strength (see, for example, PTL 1 to PTL 6).

CITATION LIST

Patent Literature

PTL 1: JP-B-55-27576
PTL 2: Japanese Patent No. 3960631
PTL 3: JP-A-6-179793
PTL 4: JP-A-5-140410
PTL 5: JP-A-2009-30001
PTL 6: JP-A-2012-52023

SUMMARY

However, when a conventional acrylic resin composition containing a rubber-containing graft copolymer is molded, the characteristic beautiful color and transparency of an acrylic resin are inevitably impaired.

Further, when the resin composition is formed into a film by melt extrusion method at a high melt extrusion temperature, cooling rolls, such as cast rolls, are contaminated with pyrolysis gas generated by pyrolysis of the graft copolymer or a bleed-out product so that productivity is reduced. Further, a pyrolysate may adhere to a die or a roll surface so that a resulting film has a poor appearance caused by die lines, dent defects, or the like.

Under the above circumstances, one or more embodiments of the present invention provide an acrylic resin composition that can provide a molded article excellent in mechanical properties such as impact resistance, transparency, and color and a film less likely to have a poor appearance caused by die lines, dent defects, or the like, and a molded article and a film thereof.

This may be achieved by using a graft copolymer having, on the inner side thereof, a hard polymer obtained in the presence of a specific mercaptan-based chain transfer agent More specifically, one or more embodiments of the present invention are directed to a resin composition comprising: an acrylic resin; and a graft copolymer, wherein the graft copolymer is a multistage-polymerized graft copolymer obtained by multistage polymerization comprising the following polymerization stages (I) to (III), the polymerization stages (I) to (III) are performed in an order such that the polymerization stage (I) is prior to the polymerization stage (II), and the polymerization stage (II) is prior to the polymerization stage (III), and the graft copolymer has a gel content of 65 to 84%:

(I) polymerizing a monomer mixture (a) ("first monomer mixture") comprising 40 to 100 wt % of a methacrylate ester and 60 to 0 wt % of another monomer having a double bond copolymerizable with the methacrylate ester and 0.01 to 10 parts by weight of a polyfunctional monomer (per 100 parts by weight of a total amount of the monomer mixture (a)) to obtain a hard polymer ("first hard polymer");

(II) polymerizing a monomer mixture (b) ("second monomer mixture") comprising 60 to 100 wt % of an acrylate ester and 0 to 40 wt % of another monomer having a double bond copolymerizable with the acrylate ester and 0.1 to 5 parts by weight of a polyfunctional monomer (per 100 parts by weight of a total amount of the monomer mixture (b)) to obtain a soft polymer; and (III) polymerizing a monomer mixture (c) ("third monomer mixture") comprising 60 to 100 wt % of a methacrylate ester and 40 to 0 wt % of another monomer having a double bond copolymerizable with the methacrylate ester and 0 to 10 parts by weight of a polyfunctional monomer (per 100 parts by weight of a total amount of the monomer mixture (c)) to obtain a hard polymer ("second hard polymer"), wherein in the polymerization stage (I), the monomer mixture (a) and the polyfunctional monomer are polymerized in a presence of a primary alkyl mercaptan-based chain transfer agent and/or a secondary alkyl mercaptan-based chain transfer agent.

In the resin composition according to one or more embodiments of the present invention, the polymerization in the polymerization stage (I) may be performed in the presence of a primary alkyl mercaptan-based chain transfer agent.

In the resin composition according to one or more embodiments of the present invention, the primary alkyl mercaptan-based chain transfer agent may be n-octyl mercaptan.

In the resin composition according to one or more embodiments of the present invention, an amount of the primary alkyl mercaptan-based chain transfer agent and/or the secondary alkyl mercaptan-based chain transfer agent used in the polymerization stage (I) may be more than 50 wt % but 100 wt % or less of a total amount of a chain transfer agent used.

In the resin composition according to one or more embodiments of the present invention, a polymerization initiator used in the multistage polymerization performed to obtain the graft copolymer may be one whose 10-hr half-life temperature is 100° C. or lower.

In the resin composition according to one or more embodiments of the present invention, the monomer mixture (a) may comprise 40 to 99.9 wt % of a methacrylate ester, 0.1 to 35 wt % of an acrylate ester, 0 to 10 wt % of an aromatic vinyl monomer, and 0 to 15 wt % of another monomer having a copolymerizable double bond.

In the resin composition according to one or more embodiments of the present invention, the graft copolymer may have a 1% weight loss temperature of 270° C. or higher as measured by TGA and a 5% weight loss temperature of 310° C. or higher as measured by TGA.

In the resin composition according to one or more embodiments of the present invention, a polymer formed up to the polymerization stage (II) by performing the polymerization stages (I) and (II) in obtaining the graft copolymer may have an average particle diameter of 50 to 400 nm.

The resin composition according to one or more embodiments of the present invention may comprise 40 to 98 parts by weight of the acrylic resin and 60 to 2 parts by weight of the graft copolymer (per 100 parts by weight of a total amount of the acrylic resin and the graft copolymer).

When the resin composition according to one or more embodiments of the present invention is molded to obtain a molded article having a thickness of 3 mm, the molded article may have a YI value of 0.50 or less.

The resin composition according to one or more embodiments of the present invention may have an Izod impact strength of 3.0 kJ/$m^2$ or more.

A molded article according to one or more embodiments of the present invention is obtained by molding the resin composition as described herein.

The molded article according to one or more embodiments of the present invention may have an injection molded article.

Further, when the resin composition according to one or more embodiments of the present invention is molded to obtain a molded article having a thickness of 3 mm, the molded article has a YI value of 0.50 or less and an Izod impact strength of 3.0 kJ/$m^2$ or more.

One or more embodiments of the present invention are also directed to a resin composition comprising: an acrylic resin; and a graft copolymer (hereinafter, also referred to as "second resin composition according to one or more embodiments of the present invention"), wherein: the graft copolymer has, on an inner side thereof, a hard polymer (I) containing, as structural units, 40 to 100 wt % of a methacrylate ester unit (a-1), 60 to 0 wt % of another monomer unit (a-2) having a double bond copolymerizable with the methacrylate ester unit, and 0.01 to 10 parts by weight of a polyfunctional monomer unit per 100 parts by weight of a total amount of the (a-1) and the (a-2), at least part of the hard polymer (I) is coated with a soft polymer (II) containing, as structural units, 60 to 100 wt % of an acrylate ester unit (b-1), 0 to 40 wt % of another monomer unit (b-2) having a double bond copolymerizable with the acrylate ester unit, and 0.1 to 5 parts by weight of a polyfunctional monomer unit per 100 parts by weight of a total amount of the (b-1) and the (b-2), a hard polymer (III) containing, as structural units, 60 to 100 wt % of a methacrylate ester unit (c-1), 40 to 0 wt % of another monomer unit (c-2) having a double bond copolymerizable with the methacrylate ester unit, and 0 to 10 parts by weight of a polyfunctional monomer unit per 100 parts by weight of a total amount of the (c-1) and the (c-2) is grafted on the polymer (I) and/or the polymer (II), the graft copolymer has a gel content of 65 to 84%, and the polymer (I) has a primary alkylthio group and/or a secondary alkylthio group.

It is to be noted that the graft copolymer contained in the second resin composition according to one or more embodiments of the present invention is obtained by multistage polymerization comprising the above-described polymerization stages (I) to (III) as in the case of the above-described multistage-polymerized graft copolymer.

In the second resin composition according to one or more embodiments of the present invention, the polymer (I) may have the primary alkylthio group, or may have an n-octylthio group.

In the second resin composition according to one or more embodiments of the present invention, the (a-1) and (a-2) of the polymer (I) may comprise 40 to 99.9 wt % of a methacrylate ester unit (a-1), 0.1 to 35 wt % of an acrylate ester unit (a-21), 0 to 10 w % of an aromatic vinyl monomer unit (a-22), and 0 to 15 wt % of another monomer unit (a-23) having a double bond copolymerized with them.

In the second resin composition according to one or more embodiments of the present invention, the graft copolymer may have a 1% weight loss temperature of 270° C. or higher as measured by TGA and a 5% weight loss temperature of 310° C. or higher as measured by TGA.

The second resin composition according to one or more embodiments of the present invention may have a sea-island structure in which the graft copolymer is dispersed as islands in the acrylic resin, the islands (domains) having an average particle diameter of 50 to 400 nm.

The second resin composition according to one or more embodiments of the present invention may comprise 40 to 98 parts by weight of the acrylic resin and 60 to 2 parts by weight of the graft copolymer (per 100 parts by weight of a total amount of the acrylic resin and the graft copolymer).

When the second resin composition according to one or more embodiments of the present invention is molded to obtain a molded article having a thickness of 3 mm, the molded article may have a YI value of 0.50 or less.

The second resin composition according to one or more embodiments of the present invention may have an Izod impact strength of 3.0 kJ/$m^2$ or more.

A molded article according to one or more embodiments of the present invention is obtained by molding the second resin composition as described herein. In one or more embodiments, the molded article may be an injection molded article.

In the first and second resin compositions according to one or more embodiments of the present invention, the acrylic resin may have a glass transition temperature of 115° C. or higher, or may contain at least one selected from the group consisting of a glutarimide acrylic resin, a maleimide acrylic resin, a partially-hydrogenated styrene unit-containing acrylic polymer, an acrylic polymer having a cyclic acid anhydride structure, an acrylic polymer comprising 97 to 100 wt % of methyl methacrylate and 3 to 0 wt % of methyl acrylate, and an acrylic polymer containing a hydroxyl group and/or a carboxyl group.

An acrylic resin film according to one or more embodiments of the present invention is obtained by molding the first or second resin composition as described herein. The acrylic resin film according to one or more embodiments of the present invention may have a thickness of 10 to 500 μm.

The acrylic resin film according to one or more embodiments of the present invention may be an optical film.

One or more embodiments of the present invention are also directed to an optical member comprising the acrylic resin film as described herein, and a laminate comprising a base material and the acrylic resin film laminated on the base material.

According to one or more embodiments of the present invention, it is possible to provide an acrylic resin composition that can provide a molded article excellent in mechanical properties such as impact resistance, transparency, and color and a film less likely to have a poor appearance caused by die lines, dent defects, or the like, and a molded article and a film thereof.

DETAILED DESCRIPTION OF THE EMBODIMENTS

Hereinbelow, one or more embodiments of the present invention will be described in detail. However, the present invention is not limited to these embodiments.

(Acrylic Resin)

An acrylic resin used in a resin composition according to one or more embodiments of the present invention is a resin containing, as a structural unit, a vinyl-based monomer including a (meth)acrylate ester, and may be a known acrylic resin. Particularly, the acrylic resin may be one containing a structural unit derived from a methacrylate ester, or one containing 30 wt % or more, or 50 wt % or more of an alkyl methacrylate ester unit whose alkyl group has 1 to 4 carbon atoms. From the viewpoint of thermal stability, the acrylic resin may be one containing, as structural units, 30 to 100 wt % of methyl methacrylate and 70 to 0 wt % of another vinyl-based monomer copolymerizable therewith.

The another vinyl-based monomer copolymerizable with methyl methacrylate may be, for example, a (meth)acrylate ester whose alkyl group has 1 to 10 carbon atoms (except for methyl methacrylate). Specific examples of the another vinyl-based monomer copolymerizable with methyl methacrylate include: methacrylate esters such as ethyl methacrylate, propyl methacrylate, butyl methacrylate, cyclohexyl methacrylate, 2-ethyhexyl methacrylate, benzyl methacrylate, octyl methacrylate, glycidyl methacrylate, epoxycyclohexylmethyl methacrylate, dimethylaminoethyl methacrylate, 2-hydroxyethyl methacrylate, 2-hydroxypropyl methacrylate, dicyclopentanyl methacrylate, 2,2,2-trifluoroethyl methacrylate, 2,2,2-trichloroethyl methacrylate, isobornyl methacrylate, methacrylamide, and N-methylol methacrylamide; acrylate esters such as methyl acrylate, ethyl acrylate, propyl acrylate, butyl acrylate, 2-ethylhexyl acrylate, octyl acrylate, glycidyl acrylate, epoxycyclohexylmethyl acrylate, 2-hydroxyethyl acrylate, 2-hydroxypropyl acrylate, acrylamide, and N-methylol acrylamide; carboxylic acids such as methacrylic acid and acrylic acid and salts thereof; vinyl cyanides such as acrylonitrile and methacrylonitrile; vinylallenes such as styrene, α-methylstyrene, monochlorostyrene, and dichlorostyrene; maleimides such as N-phenylmaleimide, N-cyclohexylmaleimide, and N-methylmaleimide; maleic acid and fumaric acid and esters thereof; vinyl halides such as vinyl chloride, vinyl bromide, and chloroprene; vinyl esters such as vinyl formate, vinyl acetate, and vinyl propionate; alkenes such as ethylene, propylene, butylene, butadiene, and isobutylene; alkene halides; and polyfunctional monomers such as allyl methacrylate, diallyl phthalate, triallyl cyanurate, monoethylene glycol dimethacrylate, tetraethylene glycol dimethacrylate, tetraethylene glycol dimethacrylate, and divinyl benzene. These vinyl-based monomers may be used singly or in combination of two or more of them.

From the viewpoint of optical properties, appearance, weather resistance, and heat resistance, the amount of methyl methacrylate contained in the acrylic resin as a structural unit may be 30 to 100 wt %, or 50 to 100 wt %, or 50 to 99.9 wt %, or 50 to 98 wt %, and the amount of the another vinyl-based monomer copolymerizable with methyl methacrylate may be 70 to 0 wt %, or 50 to 0 wt %, or 50 to 0.1 wt %, or 50 to 2 wt %. It is to be noted that from the viewpoint of processability and appearance, the acrylic resin may not contain a polyfunctional monomer.

The glass transition temperature of the acrylic resin contained in the resin composition according to one or more embodiments of the present invention can be set in accordance with its use conditions and intended use. When the resin composition according to one or more embodiments of the present invention is used for purposes not requiring excellent heat resistance, the glass transition temperature may be lower than 115° C., or may be 90° C. or higher from the viewpoint of heat resistance during use. On the other hand, when the resin composition according to one or more embodiments of the present invention is used for purposes requiring heat resistance, the acrylic resin may be a highly heat-resistant one having a glass transition temperature of 115° C. or higher. The glass transition temperature of the acrylic resin may be 118° C. or higher, or 120° C. or higher, or 125° C. or higher.

The highly heat-resistant acrylic resin may be an acrylic resin having a cyclic structure in its main chain Examples of the cyclic structure include a maleimide structure (including an N-substituted maleimide structure), a glutarimide structure, a glutaric anhydride structure, a maleic anhydride structure, and a lactone ring structure. Alternatively, the highly heat-resistant acrylic resin may be an acrylic resin containing a (meth)acrylic acid structural unit in its molecule. Specific examples of such an acrylic resin include a maleimide acrylic resin (acrylic resin copolymerized with a non-substitute or N-substituted maleimide compound as a copolymerization component), a glutarimide acrylic resin, a lactone ring-containing acrylic resin, an acrylic resin containing a hydroxyl group and/or a carboxyl group, a methacrylic resin, a partially hydrogenated styrene unit-containing acrylic polymer obtained by partially hydrogenating an aromatic ring of a styrene-containing acrylic polymer obtained by polymerization of a styrene monomer and another monomer copolymerizable therewith, and an acrylic polymer containing a cyclic acid anhydride structure such as a glutaric anhydride structure or a maleic anhydride structure. Among them, from the viewpoint of improving the heat resistance of a resulting acrylic resin film, a lactone ring-containing acrylic resin, a maleimide acrylic resin, a glutarimide acrylic resin, a glutaric anhydride structure-containing acrylic resin, a maleic anhydride structure-containing acrylic resin, and an acrylic polymer comprising 97 to 100 wt % of methyl methacrylate and 3 to 0 wt % of methyl acrylate may be used. Particularly, a glutarimide acrylic resin and a maleimide acrylic resin may be used for their excellent optical properties. A glutarimide acrylic resin and a maleimide acrylic resin may be used in combination. Both the resins are highly mutually soluble, and therefore high transparency can be maintained and excellent optical properties can be achieved. In addition, high thermal stability and solvent resistance can be achieved.

An example of the maleimide acrylic resin includes one having a maleimide unit represented by the following general formula (5) and a (meth)acrylate ester unit:

[Chemical Formula 1]

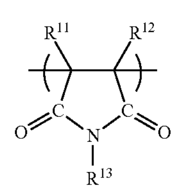

(5)

(wherein $R^{11}$ and $R^{12}$ are each independently a hydrogen atom, an alkyl group having 1 to 12 carbon atoms, or an aryl group having 6 to 14 carbon atoms, and $R^{13}$ is a hydrogen atom, an arylalkyl group having 7 to 14 carbon atoms, an aryl group having 6 to 14 carbon atoms, a cycloalkyl group having 3 to 12 carbon atoms, an alkyl group having 1 to 18 carbon atoms, or an aryl group having 6 to 14 carbon atoms or an alkyl group having 1 to 12 carbon atoms which has at least one substituent group selected from the following group A:

group A: halogen atom, hydroxyl group, nitro group, alkoxy group having 1 to 12 carbon atoms, alkyl group having 1 to 12 carbon atoms, and arylalkyl group having 7 to 14 carbon atoms).

Specific examples of the maleimide unit represented by the general formula (5) include a non-substituted maleimide unit, an N-methyl maleimide unit, an N-phenyl maleimide unit, an N-cyclohexyl maleimide unit, and an N-benzyl maleimide unit. These maleimide units may be contained singly or in combination of two or more of them.

For the purpose of adjusting optical properties, the maleimide acrylic resin may further have an aromatic vinyl unit.

The glutarimide acrylic resin is an acrylic resin having a glutarimide structure. An example of the glutarimide acrylic resin includes a resin having a unit represented by the following general formula (1) and a unit represented by the following general formula (2).

[Chemical Formula 2]

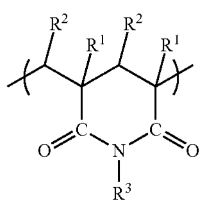

(1)

In the above general formula (1), $R^1$ and $R^2$ are each independently hydrogen or an alkyl group having 1 to 8 carbon atoms, and $R^3$ is hydrogen, an alkyl group having 1 to 18 carbon atoms, a cycloalkyl group having 3 to 12 carbon atoms, or a substituent group having an aromatic ring and 5 to 15 carbon atoms. Hereinafter, the unit represented by the above general formula (1) is also referred to as "glutarimide unit".

In the above general formula (1), $R^1$ and $R^2$ may be each independently hydrogen or a methyl group, $R^3$ may be hydrogen, a methyl group, a butyl group, or a cyclohexyl group, and $R^1$, $R^2$, and $R^3$ may be a methyl group, hydrogen, and a methyl group, respectively.

The glutarimide acrylic resin may contain only one kind of glutarimide unit or may contain two or more kinds of glutarimide units between which any one of $R^1$, $R^2$, and $R^3$ in the above general formula (1) is different or all of them are different.

The glutarimide unit can be formed by imidizing a (meth)acrylate ester unit represented by the following general formula (2). Alternatively, the glutarimide unit may be formed by imidizing an acid anhydride such as maleic anhydride, a half ester obtained from the acid anhydride and a linear or branched alcohol having 1 to 20 carbon atoms, or α,β-ethylenic unsaturated carboxylic acid (e.g., acrylic acid, methacrylic acid, maleic acid, itaconic acid, crotonic acid, fumaric acid, or citraconic acid).

The glutarimide unit content of the glutarimide acrylic resin is not particularly limited, and can be appropriately determined in consideration of, for example, the structure of $R^3$. However, the glutarimide unit content may be 1.0 wt % or more, or 3.0 wt % to 90 wt %, or 5.0 wt % to 60 wt % with respect to the total weight of the glutarimide acrylic resin. If the glutarimide unit content is less than the above lower limit, the resulting glutarimide acrylic resin tends to be poor in heat resistance or tends to have impaired transparency. On the other hand, if the glutarimide unit content exceeds the above upper limit, heat resistance and melt viscosity become unnecessarily high, which tends to deteriorate mold-workability, significantly decrease mechanical strength when a resulting film is processed, or impair transparency.

The glutarimide unit content is calculated in the following manner.

A resin is subjected to $^1$-NMR analysis using $^1$-NMR BRUKER AvanceIII (400 MHz) to determine the amount of each monomer unit, such as a glutarimide unit or an ester unit, contained in the resin (mol %), and the monomer unit content (mol %) is converted to a monomer unit content (wt %) using the molecular weight of each monomer unit.

For example, when the resin is composed of a glutarimide unit whose $R^3$ in the above general formula (1) is a methyl group and a methyl methacrylate unit, the glutarimide unit content (wt %) of the resin can be determined from the following calculation formula using the area a of a peak derived from protons of O—$CH_3$ of methyl methacrylate and appearing at around 3.5 to 3.8 ppm and the area b of a peak derived from protons of N—$CH_3$ of glutarimide and appearing at around 3.0 to 3.3 ppm.

$$[\text{Methyl methacrylate unit content } A \text{ (mol \%)}]=100\times a/(a+b)$$

$$[\text{Glutarimide unit content } B \text{ (mol \%)}]=100\times b/(a+b)$$

$$[\text{Glutarimide unit content (wt \%)}]=100\times(b\times(\text{molecular weight of glutarimide unit}))/(a\times(\text{molecular weight of methyl methacrylate unit})+b\times(\text{molecular weight of glutarimide unit}))$$

It is to be noted that even when the resin contains a monomer unit other than the above units, the glutarimide unit content (wt %) can be determined in the same manner as described above from the amount of each monomer unit contained in the resin (mol %) and the molecular weight of each monomer unit.

When an acrylic resin film according to one or more embodiments of the present invention is intended to be used as, for example, a polarizer protective film, the glutarimide unit content may be 20 wt % or less, or 15 wt % or less, or 10 wt % or less because birefringence is likely to be suppressed.

[Chemical Formula 3]

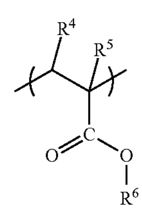

(2)

In the above general formula (2), $R^4$ and $R^5$ are each independently hydrogen or an alkyl group having 1 to 8 carbon atoms, and $R^6$ is an alkyl group having 1 to 18 carbon atoms, a cycloalkyl group having 3 to 12 carbon atoms, or a substituent group having an aromatic ring and 5 to 15 carbon atoms. Hereinafter, the unit represented by the above general formula (2) is also referred to as "(meth)acrylate ester unit". It is to be noted that in one or more embodiments of the present invention, the "(meth)acrylate" refers to "methacrylate or acrylate".

In the above general formula (2), $R^4$ and $R^5$ may be each independently hydrogen or a methyl group, $R^6$ may be hydrogen or a methyl group, and $R^4$, $R^5$, and $R^6$ may be hydrogen, a methyl group, and a methyl group, respectively.

The glutarimide acrylic resin may contain only one kind of (meth)acrylate ester unit or may contain two or more kinds of (meth)acrylate ester units between which any one of $R^4$, $R^5$, and $R^6$ in the above general formula (2) is different or all of them are different If necessary, the glutarimide acrylic resin may further contain a unit represented by the following general formula (3) (hereinafter, also referred to as "aromatic vinyl unit").

[Chemical Formula 4]

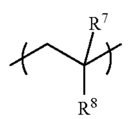

(3)

In the above general formula (3), $R^7$ is hydrogen or an alkyl group having 1 to 8 carbon atoms, and $R^8$ is an aryl group having 6 to 10 carbon atoms.

The aromatic vinyl unit represented by the above general formula (3) is not particularly limited, and examples thereof include a styrene unit and an α-methylstyrene unit. The aromatic vinyl unit may be a styrene unit The glutarimide acrylic resin may contain only one kind of aromatic vinyl unit and may contain two or more aromatic vinyl units between which one of $R^7$ and $R^8$ is different or both of them are different.

The aromatic vinyl unit content of the glutarimide acrylic resin is not particularly limited, but may be 0 to 50 wt %, or 0 to 20 wt %, or 0 to 15 wt % with respect to the total weight of the glutarimide acrylic resin. If the aromatic vinyl unit content exceeds the above upper limit, the glutarimide acrylic resin cannot have sufficient heat resistance.

However, there is a case where the glutarimide acrylic resin may contain no aromatic vinyl unit from the viewpoint of improving bending resistance and transparency, reducing fish-eyes, and improving solvent resistance or weather resistance.

If necessary, the glutarimide acrylic resin may further contain another unit other than the glutarimide unit, the (meth)acrylate ester unit, and the aromatic vinyl unit.

Examples of the another unit include amide-based units such as acrylamide and methacrylamide, a glutaric anhydride unit, and nitrile-based units such as acrylonitrile and methacrylonitrile.

The another unit may be incorporated into the glutarimide acrylic resin by random copolymerization or graft copolymerization.

The another unit may be incorporated into the glutarimide acrylic resin by copolymerization of a monomer constituting the another unit and the glutarimide acrylic resin and/or a resin used as a raw material for producing the glutarimide acrylic resin. The another unit incorporated into the glutarimide acrylic resin may be a by-product of the above-described imidization reaction.

The weight-average molecular weight of the glutarimide acrylic resin is not particularly limited, but may be in the range of $1\times10^4$ to $5\times10^5$. By setting the weight-average molecular weight of the glutarimide acrylic resin to a value within the above range, it is possible to prevent deterioration in mold-workability or to prevent a resulting film from having poor mechanical strength when the film is processed. On the other hand, if the weight-average molecular weight is less than the above lower limit, a resulting film tends to have poor mechanical strength. If the weight-average molecular weight exceeds the above upper limit, viscosity during melt extrusion tends to be high, mold-workability tends to be deteriorated, and molded article productivity tends to be reduced.

The glass transition temperature of the glutarimide acrylic resin may be 117° C. or higher so that a resulting film can have excellent heat resistance. The glass transition temperature may be 120° C. or higher, or 125° C. or higher.

Hereinbelow, one example of a method for producing a glutarimide acrylic resin will be described.

First, a (meth)acrylate ester polymer is produced by polymerization of a (meth)acrylate ester. When a glutarimide acrylic resin containing an aromatic vinyl unit is to be produced, a (meth)acrylate-aromatic vinyl copolymer is produced by copolymerization of a (meth)acrylate ester and an aromatic vinyl compound.

The (meth)acrylate ester used in this step may be, for example, methyl (meth)acrylate, ethyl (meth)acrylate, butyl (meth)acrylate, isobutyl (meth)acrylate, t-butyl (meth)acrylate, benzyl (meth)acrylate, or cyclohexyl (meth)acrylate, or may be methyl methacrylate.

These (meth)acrylate esters may be used singly or in combination of two or more of them. The use of two or more kinds of (meth)acrylate esters makes it possible to finally obtain a glutarimide acrylic resin containing two or more kinds of (meth)acrylate ester units.

The structure of the (meth)acrylate polymer or the (meth) acrylate-aromatic vinyl copolymer is not particularly limited as long as a subsequent imidization reaction can be carried out. More specifically, the (meth)acrylate polymer or the (meth)acrylate-aromatic vinyl copolymer may be a linear polymer, a block polymer, a branched polymer, a ladder polymer, a cross-linked polymer, or the like.

In the case of a block polymer, the block polymer may be any one of an A-B-type block polymer, an A-B-C-type block polymer, an A-B-A-type block polymer, and another type of block polymer.

The (meth)acrylate polymer or the (meth)acrylate-aromatic vinyl copolymer is reacted with an imidization agent to carry out an imidization reaction. In this way, a glutarimide acrylic resin can be produced.

The imidization agent is not particularly limited as long as the glutarimide unit represented by the above general formula (1) can be produced. More specifically, ammonia or a primary amine can be used. Examples of the primary amine include: aliphatic hydrocarbon group-containing primary amines such as methylamine, ethylamine, n-propylamine, i-propylamine, n-butylamine, i-butylamine, tert-butylamine, and n-hexylamine; aromatic hydrocarbon group-containing primary amines such as aniline, benzylamine, toluidine, and trichloroaniline; and alicyclic hydrocarbon group-containing primary amines such as cyclohexylamine The imidization agent may be a urea-based compound that generates ammonia or a primary amine by heating, and examples of such a compound include urea, 1,3-dimethylurea, 1,3-diethylurea, and 1,3-dipropylurea.

Among these imidization agents, ammonia, methylamine, and cyclohexylamine may be used, and methylamine may be used from the viewpoint of cost and physical properties.

In the imidization step, a cyclization promoter may be added in addition to the imidization agent, if necessary.

In the imidization step, the glutarimide unit content of a resulting glutarimide acrylic resin can be adjusted by adjusting the ratio of the imidization agent added.

A method for carrying out the imidization reaction is not particularly limited, and a conventionally-known method can be used. For example, the imidization reaction is allowed to proceed by using an extruder or a batch-type reactor (pressure vessel).

The extruder is not particularly limited, and various extruders, such as a single screw extruder, a twin screw extruder, and a multi-screw extruder, can be used.

Among them, a twin screw extruder may be used. The use of a twin screw extruder makes it possible to promote mixing of the raw material polymer and the imidization agent (or, when a ring-closing promoter is used, mixing of the raw material polymer, the imidization agent, and the ring-closing promoter).

Examples of the twin screw extruder include a non-intermeshing co-rotating twin screw extruder, an intermeshing co-rotating twin screw extruder, a non-intermeshing counter-rotating twin screw extruder, and an intermeshing counter-rotating twin screw extruder. Among them, an intermeshing co-rotating twin screw extruder may be used. The screws of an intermeshing co-rotating twin screw extruder can rotate at high speed, and therefore mixing of the raw material polymer and the imidization agent (or, when a ring-closing promoter is used, mixing of the raw material polymer, the imidization agent, and the ring-closing promoter) can be further promoted.

The above-mentioned extruders may be used singly or in combination of two or more of them connected in series.

The glutarimide acrylic resin production method may include, in addition to the above-described imidization step, an esterification step in which treatment using an esterification agent is performed. The esterification step makes it possible to convert carboxyl groups contained in the resin as a by-product of the imidization step to ester groups. This makes it possible to adjust the acid value of the glutarimide acrylic resin to a value within a desired range.

The acid value of the glutarimide acrylic resin is not particularly limited, but may be 0.50 mmol/g or less, or 0.45 mmol/g or less. The lower limit of the acid value is not particularly limited, but may be 0 mmol/g or more, or 0.05 mmol/g or more, or 0.10 mmol/g or more. By setting the acid value to a value within the above range, the glutarimide acrylic resin can offer an excellent balance of heat resistance, mechanical properties, and mold-workability. On the other hand, if the acid value exceeds the above upper limit, foaming of the resin is likely to occur during melt extrusion for film formation, which tends to deteriorate mold-workability and to reduce molded article productivity. It is to be noted that the acid value can be calculated by, for example, a titration method described in JP-A-2005-23272.

The esterification agent is not particularly limited, and examples thereof include dimethyl carbonate, 2,2-dimethoxypropane, dimethylsulfoxide, triethyl orthoformate, trimethyl orthoacetate, trimethyl orthoformate, diphenyl carbonate, dimethyl sulfate, methyl toluenesulfonate, methyl trifluoromethylsulfonate, methyl acetate, methanol, ethanol, methyl isocyanate, p-chlorophenyl isocyanate, dimethylcarbodiimide, dimethyl-t-butylsilylchloride, isopropenyl acetate, dimethylurea, tetramethylammonium hydroxide, dimethyl diethoxysilane, tetra-N-butoxysilane, dimethyl(trimethylsilane) phosphite, trimethyl phosphite, trimethyl phosphate, tricresyl phosphate, diazomethane, ethylene oxide, propylene oxide, cyclohexene oxide, 2-ethylhexylglycidyl ether, phenyl glycidyl ether, and benzyl glycidyl ether. Among them, dimethyl carbonate and trimethyl orthoacetate may be used from the viewpoint of cost, reactivity, and the like. In one or more embodiments, from the viewpoint of cost dimethyl carbonate may be used.

The amount of the esterification agent used is not particularly limited, but may be 0 to 12 parts by weight, or 0 to 8 parts by weight per 100 parts by weight of the (meth)acrylate polymer or the (meth)acrylate-aromatic vinyl copolymer. By setting the amount of the esterification agent used to a value within the above range, the acid value of the glutarimide acrylic resin can be adjusted to a value within an appropriate range. On the other hand, if the amount of the esterification agent used falls outside the above range, there is a possibility that part of the esterification agent will remain unreacted in the resin, in which case the unreacted esterification agent will become a cause of foaming or odor generation when molding is performed using the resin.

A catalyst may be used in combination with the esterification agent. The type of catalyst to be used is not particularly limited, and examples of the catalyst include aliphatic tertiary amines such as trimethylamine, triethylamine, and tributylamine. Among them, triethylamine may be used from the viewpoint of cost, reactivity and the like.

As in the case of the imidization step, the esterification step is allowed to proceed by using, for example, an extruder or a batch-type reactor.

The esterification step may be performed only by heat treatment without using the esterification agent. The heat treatment can be achieved by kneading and dispersing the melted resin in an extruder. When the esterification step is performed only by heat treatment, some or all of carboxyl groups produced as a by-product in the imidization step can be converted to acid anhydride groups by, for example, a dehydration reaction between carboxyl groups in the resin and/or a dealcoholization reaction between a carboxyl group in the resin and an alkyl ester group in the resin. At this time, a ring-closing promoter (catalyst) may be used.

Even when the esterification step is performed using the esterification agent, conversion to acid anhydride groups by heat treatment can be allowed to proceed in parallel.

In both the imidization step and the esterification step, an extruder used may be equipped with a vent port so that the pressure in the extruder can be reduced to atmospheric pressure or less. The use of such a machine makes it possible to remove the unreacted part of the imidization agent, the unreacted part of the esterification agent, a by-product such as methanol, or monomers.

The glutarimide acrylic resin can also be appropriately produced using, instead of an extruder, a high-viscosity reaction apparatus such as a horizontal twin screw reaction apparatus such as BIVOLAK manufactured by Sumitomo Heavy Industries, Ltd. or a vertical twin screw mixing vessel such as SUPER BLEND.

When the glutarimide acrylic resin is produced using a batch-type reactor (pressure vessel), the structure of the batch-type reactor (pressure vessel) is not particularly limited. More specifically, the batch-type reactor should have a structure in which the raw material polymer can be melted by heating and stirred and the imidization agent (or, when a ring-closing promoter is used, the imidization agent and the ring-closing promoter) can be added, and may have a structure excellent in stirring efficiency. The use of such a batch-type reactor can prevent insufficient stirring due to an increase in the viscosity of the polymer with the progress of the reaction. Examples of a batch-type reactor having such a structure include a mixing vessel MAX BLEND manufactured by Sumitomo Heavy Industries, Ltd, and the like.

(Graft Copolymer)

A graft copolymer used in one or more embodiments of the present invention has an excellent thermal stability, and can impart excellent transparency and color to a molded article obtained by molding the resin composition according to one or more embodiments of the present invention, and can further improve the mechanical strength, such as impact resistance, of the molded article. Further, the graft copolymer can prevent a film formed from the resin composition according to one or more embodiments of the present invention from having a poor appearance caused by die lines or dent defects. Particularly, the graft copolymer can prevent troubles with productivity such as roll contamination, and can reduce the poor appearance of the film caused by transfer of roll contaminants.

In one or more embodiments of the present invention, examples of the graft copolymer may include a multistage-polymerized polymer and a multilayer structure polymer called core-shell type polymer. The multistage-polymerized polymer is a polymer obtained by polymerizing a monomer mixture in the presence of polymer particles, and the multilayer structure polymer is a polymer (core-shell type polymer) having a polymer layer obtained by polymerizing a monomer mixture in the presence of polymer particles. Both the polymers basically refer to the same polymer, but the former is a polymer defined mainly based on its production method, and the latter is a polymer defined mainly based on its layer structure. The former will be mainly described below, but the same applies to the latter.

The graft copolymer used in one or more embodiments of the present invention can be obtained by multistage polymerization comprising at least the following polymerization stages (I) to (III).

Polymerization Stage (I)

(I) A monomer mixture (a) comprising 40 to 100 wt % of a methacrylate ester and 60 to 0 wt % of another monomer having a double bond copolymerizable with the methacrylate ester and 0.01 to 10 parts by weight of a polyfunctional monomer (per 100 parts by weight of the total amount of the monomer mixture (a)) are polymerized to obtain a hard polymer (I) (“first hard polymer”).

The another monomer having a copolymerizable double bond (hereinafter, also referred to as “copolymerizable monomer” may be an alkyl acrylate ester whose alkyl group has 1 to 12 carbon atoms and/or an aromatic vinyl monomer.

The monomer mixture (a) may comprise 40 to 100 wt % of a methacrylate ester, 0 to 35 wt % of an acrylate ester, 0 to 10 wt % of an aromatic vinyl monomer, and 0 to 15 wt % of another monomer having a copolymerizable double bond, or may comprise 40 to 99.9 wt % of a methacrylate ester, 0.1 to 35 wt % of an acrylate ester, 0 to 10 wt % of an aromatic vinyl monomer, and 0 to 15 wt % of another monomer having a copolymerizable double bond, or may comprise 40 to 99.8 wt % of a methacrylate ester, 0.1 to 35 wt % of an acrylate ester, 0.1 to 10 wt % of an aromatic vinyl monomer, and 0 to 15 wt % of another monomer having a copolymerizable double bond, or may comprise 51 to 96.9 wt % of a methacrylate ester, 3.1 to 29 wt % of an acrylate ester, 0 to 10 wt % of an aromatic vinyl ester, and 0 to 10 wt % of another monomer having a copolymerizable double bond. By setting the amount of each of the monomers in the monomer mixture (a) to a value within the above range, the graft copolymer used in one or more embodiments of the present invention can have high thermal stability and can withstand high-temperature molding. More specifically, the methacrylate ester as a main component is likely to be thermally decomposed during high-temperature molding due to zipping depolymerization, but by setting the amount of each of the acrylate ester and the aromatic vinyl monomer to a value within the above range, such zipping depolymerization can be easily prevented and thermal stability can be improved.

For example, the monomer mixture (a) comprises 51 to 96.8 wt % of a methacrylate ester, 3.1 to 29 wt % of an acrylate ester, 0.1 to 10 wt % of an aromatic vinyl monomer, and 0 to 10 wt % of another monomer having a copolymerizable double bond. By setting the amount of each of the monomers in the monomer mixture (a) to a value within the above range, as described above, zipping depolymerization can be prevented to improve thermal stability, and the resulting graft copolymer can be mixed with the acrylic resin without impairing the optical properties, such as transparency and color, of the acrylic resin.

If the methacrylate ester content of the monomer mixture (a) is less than 40 wt %, the excellent characteristics of the acrylic resin are not developed.

Examples of the methacrylate ester include methyl methacrylate, ethyl methacrylate, n-butyl methacrylate, isobutyl methacrylate, t-butyl methacrylate, hexyl methacrylate, cyclohexyl methacrylate, 2-ethylhexyl methacrylate, octyl methacrylate, isobornyl methacrylate, phenyl methacrylate, and benzyl methacrylate. For example, the methacrylate ester is an alkyl methacrylate ester whose alkyl group has 1 to 4 carbon atoms, and examples of such an alkyl methacrylate ester include methyl methacrylate, ethyl methacrylate, n-butyl methacrylate, isobutyl methacrylate, and t-butyl methacrylate. These methacrylate esters may be used singly or in combination of two or more of them. In one or more embodiments of the invention, the methacrylate ester may be methyl methacrylate.

The another monomer having a copolymerizable double bond may be at least one selected from the group consisting of an acrylate ester, an aromatic vinyl-based monomer, and another monomer having a copolymerizable double bond, or may be one or two or more monomers selected from the group consisting of an alkyl acrylate ester whose alkyl group has 1 to 12 carbon atoms, an aromatic vinyl-based monomer, and another copolymerizable monomer. Examples of the acrylate ester include an alkyl acrylate ester whose alkyl group has 1 to 12 carbon atoms, isobornyl acrylate, phenyl acrylate, and benzyl acrylate. Examples of the alkyl acrylate ester whose alkyl group has 1 to 12 carbon atoms include ethyl acrylate, n-butyl acrylate, n-octyl acrylate, 2-ethylhexyl acrylate, and cyclohexyl acrylate. Examples of the aromatic vinyl-based monomer include styrene, α-methyl styrene, chlorostyrene, and another styrene derivative. Examples of the copolymerizable monomer other than the (meth)acrylate ester and the aromatic vinyl monomer include an unsaturated nitrile-based monomer such as acrylonitrile or methacrylonitrile, an α,β-unsaturated carboxyl acid such as acrylic acid, methacrylic acid, or crotonic acid, vinyl acetate, an olefin-based monomer such as ethylene or propylene, a vinyl halide-based monomer such as vinyl chloride, vinylidene chloride, or vinylidene fluoride, and a maleimide-based monomer such as N-ethyl maleimide, N-propyl maleimide, N-cyclohexyl maleimide, and N-o-chlorophenyl maleimide. These copolymerizable monomers may be used singly or in combination of two or more of them. The another monomer having a copolymerizable double bond may be an alkyl acrylate ester whose alkyl group has 1 to 12 carbon atoms and/or an aromatic vinyl monomer.

The amount of the polyfunctional monomer used in the polymerization stage (I) may be 0.01 to 10 parts by weight, or 0.01 to 7 parts by weight, or 0.01 to 5 parts by weight, or 0.01 to 2 parts by weight per 100 parts by weight of the total amount of the monomer mixture (a). If the amount of the polyfunctional monomer used is less than 0.01 parts by weight, a resulting molded article or film has low transparency, and if the amount of the polyfunctional monomer used exceeds 10 parts by weight, the effect of improving impact strength is reduced.

The polyfunctional monomer to be used may be either one known as a cross-linking agent or one known as a cross-linkable monomer. Examples of the cross-linkable monomer include allyl methacrylate, allyl acrylate, diallyl maleate, diallyl fumarate, diallyl itacoate, monoallyl maleate, monoallyl fumarate, butadiene, and divinyl benzene. These cross-linkable monomers may be used singly or in combination of two or more of them. In one or more embodiments, allyl methacrylate may be used alone, or allyl methacrylate and another polyfunctional monomer may be used in combination.

In the polymerization stage (I), a mixture of the monomer mixture (a) and the polyfunctional monomer is polymerized in the presence of a primary alkyl mercaptan-based chain transfer agent and/or a secondary alkyl mercaptan-based chain transfer agent to obtain a polymer (I).

The amount of the primary alkyl mercaptan-based chain transfer agent and/or the secondary alkyl mercaptan-based chain transfer agent used in the polymerization stage (I) may be 0.01 to 6.0 parts by weight per 100 parts by weight of the monomer mixture (a). The lower limit may be 0.03 parts by weight, or 0.1 parts by weight, or 0.24 parts by weight, or 0.26 parts by weight, or 0.3 parts by weight. The upper limit may be 3 parts by weight, or 1.6 parts by weight. It is generally known that when a sulfur content is higher, higher thermal stability is achieved. Further, a chain transfer agent is generally used to adjust the molecular weight of a polymer. When the amount of a chain transfer agent used is increased, the amount of a free polymer having a low molecular weight is increased. Therefore, when a chain transfer agent is used in a larger amount, the graft copolymer obtained by polymerization imparts superior fluidity to a mixture of the graft copolymer and the acrylic resin when the mixture is molded. On the other hand, if a chain transfer agent is excessively used, there is a case where a resulting molded article is less likely to have adequate impact resistance, or a resulting acrylic resin film is less likely to have adequate mechanical properties such as bending resistance, cracking resistance during slitting, and cracking resistance during punching. However, by using the primary alkyl mercaptan-based chain transfer agent and/or the secondary alkyl mercaptan-based chain transfer agent within the above range, it is possible to obtain a graft copolymer that offers an excellent balance of impact resistance, thermal stability, and fluidity during molding. If the amount of the chain transfer agent used exceeds 6.0 parts by weight, the effect of improving impact strength tends to reduce. The primary alkyl mercaptan-based chain transfer agent and/or the secondary alkyl mercaptan-based chain transfer agent to be used may be a generally-known chain transfer agent. Specific examples of the chain transfer agent include a primary alkyl mercaptan-based chain transfer agent such as n-butyl mercaptan, n-octyl mercaptan, n-hexadecyl mercaptan, n-dodecyl mercaptan, or n-tetradecyl mercaptan and a secondary alkyl mercaptan-based chain transfer agent such as s-butyl mercaptan or s-dodecyl mercaptan. These chain transfer agents may be used singly or in combination of two or more of them.

Further, the chain transfer agent used in the polymerization stage (I) may be a primary alkyl mercaptan-based chain transfer agent, or n-octyl mercaptan or n-dodecyl mercaptan, or n-octyl mercaptan.

In the graft copolymer used in one or more embodiments of the present invention, the polymer (I) obtained in the polymerization stage (I) has a primary alkylthio group derived from the primary alkyl mercaptan-based chain transfer agent and/or a secondary alkylthio group derived from the secondary alkyl mercaptan-based chain transfer agent. The alkylthio group refers to a structure represented by a chemical formula, RS— (R is an alkyl group), and therefore the primary alkylthio group means that the R is a primary alkyl group, and the secondary alkylthio group means that the R is a secondary alkyl group.

Almost all the primary alkyl mercaptan-based chain transfer agent and/or the secondary alkyl mercaptan-based chain transfer agent used may be incorporated as an alkylthio group into the polymer (I) obtained in the polymerization step (I). More specifically, the amount of the alkylthio group in the graft copolymer used in one or more embodiments of the present invention may be 0.01 to 6.0 parts by weight, or 0.03 to 6.0 parts by weight, or 0.1 to 3 parts by weight, or 0.24 to 1.6 parts by weight per 100 parts by weight of the total amount of 40 to 100 wt % of a methacrylate ester unit (a-1) and 60 to 0 wt % of another monomer unit having a copolymerizable double bond (a-2).

Polymerization Stage (II)

In the polymerization stage (II), a monomer mixture (b) comprising 60 to 100 wt % of an acrylate ester and 0 to 40 wt % of another monomer having a double bond copolymerizable with the acrylate ester and 0.1 to 5 parts by weight of a polyfunctional monomer (per 100 parts by weight of the total amount of the monomer mixture (b)) are polymerized to obtain a soft polymer (II) ("second soft polymer").

The another monomer having a copolymerizable double bond may be at least one selected from the group consisting of a methacrylate ester and another monomer having a copolymerizable double bond.

The monomer mixture (b) may comprise 60 to 100 wt % of an acrylate ester, 0 to 40 wt % of a methacrylate ester, and 0 to 20 wt % of another monomer having a copolymerizable double bond. However, from the viewpoint of obtaining a molded article or film excellent in transparency and color, the monomer mixture (b) may comprise 60 to 100 wt % of an acrylate ester, 0 to 10 wt % of a methacrylate ester, 0 to 40 wt % of an aromatic vinyl-based monomer, and 0 to 10 wt % of another monomer having a copolymerizable double bond.

Examples of the acrylate ester include an alkyl acrylate ester whose alkyl group has 1 to 12 carbon atoms, isobornyl acrylate, phenyl acrylate, and benzyl acrylate. Among them, an alkyl acrylate ester whose alkyl group has 1 to 12 carbon atoms may be used. Examples of the alkyl acrylate ester whose alkyl group has 1 to 12 carbon atoms include ethyl acrylate, n-butyl acrylate, n-octyl acrylate, 2-ethylhexyl acrylate, and cyclohexyl acrylate. These acrylate esters may be used singly or in combination of two or more of them. The alkyl acrylate ester may be n-butyl acrylate, a combination of n-butyl acrylate and ethyl acrylate, or a combination of n-butyl acrylate and 2-ethylhexyl acrylate. The n-butyl acrylate content of the acrylate ester used in the polymerization stage (II) may be 50 to 100 wt %, or 70 to 100 wt %, or 80 to 100 wt %.

The methacrylate ester, the another monomer having a copolymerizable double bond, and the polyfunctional monomer used in the polymerization step (II) are the same as those described above with reference to the polymerization stage (I).

It is to be noted that the graft copolymer used in one or more embodiments of the present invention has a structure in which at least part of the polymer (I) formed in the polymerization stage (I) and located on the inner side of the graft copolymer is coated with the polymer (II) formed in the polymerization stage (II). Part of the polymer (II) may penetrate into the polymer (I). The polymer (I) may, of course, be entirely coated with the polymer (II).

Polymerization Stage (III)

In the polymerization stage (III), a monomer mixture (c) comprising 60 to 100 wt % of a methacrylate ester and 40 to 0 wt % of another monomer having a double bond copolymerizable with the methacrylate ester and 0 to 10 parts by weight of a polyfunctional monomer (per 100 parts by weight of the total amount of the monomer mixture (c)) are polymerized to obtain a hard polymer (III) ("third hard polymer").

The graft copolymer used in one or more embodiments of the present invention has a structure in which the polymer (III) is grafted on the polymer (I) and/or the polymer (II). However, all the polymer (III) does not need to be grafted, and part of the polymer (III) may be present as a polymer component without being grafted on the polymer (I) and/or the polymer (II). The polymer component that is not grafted on the polymer (I) and/or the polymer (II) is regarded as a constituent part of the graft copolymer used in one or more embodiments of the present invention.

The monomer mixture (c) may comprise 60 to 100 wt % of a methacrylate ester, 30 to 0 wt % of an acrylate ester, and 10 to 0 wt % of another monomer having a copolymerizable double bond.

Examples of the methacrylate ester include methyl methacrylate, ethyl methacrylate, n-butyl methacrylate, isobutyl methacrylate, t-butyl methacrylate, hexyl methacrylate, cyclohexyl methacrylate, 2-ethylhexyl methacrylate, octyl methacrylate, isobornyl methacrylate, phenyl methacrylate, and benzyl methacrylate. For example, the methacrylate ester is an alkyl methacrylate ester whose alkyl group has 1 to 4 carbon atoms, and examples of such an alkyl methacrylate ester include methyl methacrylate, ethyl methacrylate, n-butyl methacrylate, isobutyl methacrylate, and t-butyl methacrylate. These methacrylate esters may be used singly or in combination of two or more of them. In one or more embodiments of the present invention, the methacrylate ester may be methyl methacrylate.

The another monomer having a copolymerizable double bond may be at least one selected from the group consisting of an acrylate ester, an aromatic vinyl-based monomer, and another copolymerizable monomer, or may be one or two or more monomers selected from the group consisting of an alkyl acrylate ester whose alkyl group has 1 to 12 carbon atoms, an aromatic vinyl-based monomer, and another copolymerizable monomer. Examples of the acrylate ester include an alkyl acrylate ester whose alkyl group has 1 to 12 carbon atoms, isobornyl acrylate, phenyl acrylate, and benzyl acrylate. Examples of the alkyl acrylate ester whose alkyl group has 1 to 12 carbon atoms include ethyl acrylate, n-butyl acrylate, n-octyl acrylate, 2-ethylhexyl acrylate, and cyclohexyl acrylate. Examples of the aromatic vinyl-based monomer include styrene, α-methyl styrene, chlorostyrene, and another styrene derivative. Examples of the copolymerizable monomer other than the alkyl (meth)acrylate ester and the aromatic vinyl-based monomer include an unsaturated nitrile-based monomer such as acrylonitrile or methacrylonitrile, an α,β-unsaturated carboxyl acid such as acrylic acid, methacrylic acid, or crotonic acid, vinyl acetate, an olefin-based monomer such as ethylene or propylene, a vinyl halide-based monomer such as vinyl chloride, vinylidene chloride, or vinylidene fluoride, and a maleimide-based monomer such as N-ethyl maleimide, N-propyl maleimide, N-cyclohexyl maleimide, and N-o-chlorophenyl maleimide. These copolymerizable monomers may be used singly or in combination of two or more of them.

The polyfunctional monomer used in the polymerization stage (III) is the same as that described above with reference to the polymerization stage (I). In the polymerization stage (H), the polyfunctional monomer may or may not be used. However, from the viewpoint of providing a resin composition with excellent mechanical strength, the polyfunctional monomer may not be used. Further, the monomer mixture (c) may be the same as or different from the monomer mixture (a).

Polymerization Stage (IV)

The multistage polymerization for obtaining the graft copolymer used in one or more embodiments of the present invention may comprise a polymerization stage other than the polymerization stages (I) to (IV).

In one or more embodiments, a graft copolymer obtained by further performing a polymerization stage (IV) after the polymerization stages (I) to (III) may be used as the graft copolymer. Further, in one or more embodiments of the present invention, a graft copolymer obtained by performing a polymerization stage (IV) after the polymerization stage (II) but prior to the polymerization stage (III) may be used as the graft copolymer.

In the polymerization stage (IV), a mixture of a monomer mixture (d) comprising 40 to 100 wt % of a methacrylate ester, 0 to 60 wt % of an acrylate ester, and 0 to 5 wt % of another monomer having a copolymerizable double bond and 0 to 10 parts by weight of a polyfunctional monomer (per 100 parts by weight of the monomer mixture (d)) may be polymerized to obtain a hard polymer (IV).

The methacrylate ester, the acrylate ester, the another monomer having a copolymerizable double bond, and the polyfunctional monomer used in the polymerization stage (IV) are the same as those described above with reference to the polymerization stages (I) to (III). In the polymerization stage (IV), the polyfunctional monomer may or may not be used. However, from the viewpoint of providing a resin composition with excellent mechanical strength, the polyfunctional monomer may not be used. Further, the monomer mixtures (a), (c), and (d) may be the same or different from one another.

The graft copolymer used in one or more embodiments of the present invention may have a structure in which the hard polymer (IV) formed in the polymerization stage (IV) is grafted on the polymer (I) and/or the polymer (II) and/or the polymer (III). It is to be noted that the polymer (IV) is grafted on the polymer (I) and/or the polymer (II) and/or the polymer (III). However, all the polymer (IV) does not need to be grafted thereon, and part of the polymer (IV) may be present as a polymer component without being grafted on any one of the polymer (I), the polymer (II), and the polymer (III). The polymer component that is not grafted on any one of the polymer (I), the polymer (II), and the polymer (III) is regarded as a constituent part of the graft copolymer used in one or more embodiments of the present invention.

The graft copolymer used in one or more embodiments of the present invention is obtained by multistage polymerization comprising the polymerization stages (I) to (III), and the polymerization stages (I) to (III) are performed in an order such that the polymerization stage (I) is prior to the polymerization stage (II), and the polymerization stage (II) is prior to the polymerization stage (III). The graft copolymer used in one or more embodiments of the present invention may be obtained through the three stages (I), (II), and (III), or through the four stages (I), (II), (III), and (IV). When the multistage polymerization further comprises the polymerization stage (IV), the polymerization stage (IV) may be prior to or after the polymerization stage (III) as long as the polymerization stage (IV) is after the polymerization stage (II). The multistage polymerization may further comprise another polymerization stage performed prior to or after any one of the polymerization stages (I) to (III) or the polymerization stages (I) to (IV).

In one or more embodiments of the present invention, when a resulting film is stretched before use (stretched film), the graft copolymer may be obtained by the multistage polymerization in which one or more polymerization stages, at least one of which is the polymerization stage (IV), for forming a hard polymer are performed before and/or after the polymerization stage (III). Particularly, the graft copolymer may be obtained by four-stage polymerization comprising the polymerization stage (I), the polymerization stage (II), the polymerization stage (III), and the polymerization stage (IV). The polymerization stage (IV) may be either prior to or after the polymerization stage (III) as long as the polymerization stage (IV) is after the polymerization stage (II). When the multistage polymerization comprises at least the polymerization stage (III) and the polymerization stage (IV), haze deterioration (whitening) that may be caused by film stretching may be prevented.

It is to be noted that the order in which the polymerization stage (III) and the polymerization stage (IV) are performed is not particularly limited, but the polymerization stage (IV) may be performed after the polymerization stage (III).

In one or more embodiments of the present invention, an example of the graft copolymer is one obtained by (I) polymerizing a monomer mixture (a) comprising 40 to 100 wt % of a methacrylate ester and 60 to 0 wt % of another monomer having a double bond copolymerizable with the methacrylate ester and 0.01 to 10 parts by weight (per 100 parts by weight of the total amount of the monomer mixture (a)) of a polyfunctional monomer in the presence of a primary alkyl mercaptan-based chain transfer agent and/or a secondary alkyl mercaptan-based chain transfer agent to obtain a hard polymer, (II) polymerizing a monomer mixture (b) comprising 60 to 100 wt % of an acrylate ester and 0 to 40 wt % of another monomer having a double bond copolymerizable with the acrylate ester and 0.1 to 5 parts by weight (per 100 parts by weight of the total amount of the monomer mixture (b)) of a polyfunctional monomer in the presence of the hard polymer to obtain a soft polymer, and (III) polymerizing a monomer mixture (c) comprising 60 to 100 wt % of a methacrylate ester and 40 to 0 wt % of another monomer having a double bond copolymerizable with the methacrylate ester and 0 to 10 parts by weight (per 100 parts by weight of the total amount of the monomer mixture (c)) of a polyfunctional monomer in the presence of the soft polymer. Further, in the presence of a hard polymer obtained in the polymerization stage (III), a monomer mixture (d) comprising 40 to 100 wt % of a methacrylate ester, 0 to 60 wt % of an acrylate ester, and 0 to 5 wt % of another monomer having a copolymerizable double bond and 0 to 10 parts by weight of a polyfunctional monomer (per 100 parts by weight of the monomer mixture (d)) may be polymerized to obtain a hard polymer. The obtained graft copolymer may also be used in one or more embodiments. Alternatively, between the polymerization stage (II) and the polymerization stage (III), a monomer mixture (d) comprising 40 to 100 wt % of a methacrylate ester, 0 to 60 wt % of an acrylate ester, and 0 to 5 wt % of another monomer having a copolymerizable double bond and 0 to 10 parts by weight of a polyfunctional monomer (per 100 parts by weight of the monomer mixture (d)) may be polymerized to obtain a hard polymer. The obtained graft copolymer may also be used in one or more embodiments.

The total amount of the monomer mixtures (a), (b), and (c) in the polymerization stages (I) to (III) may be 80 to 100 parts by weight, or 90 to 100 parts by weight, or 95 to 100 parts by weight per 100 parts by weight of the total amount of monomer mixtures constituting the graft copolymer.

When the multistage polymerization further comprises the polymerization stage (IV), the amount of the monomer mixture (d) may be 0.1 to 20 parts by weight, or 1 to 15 parts by weight per 100 parts by weight of the total amount of monomer mixtures constituting the graft copolymer.

The amount of the monomer mixture (b) may be 20 to 90 parts by weight, or 40 to 90 parts by weight, or 45 to 85 parts by weight per 100 parts by weight of the total amount of monomer mixtures in the graft copolymer.

The amount of the monomer mixture (a) may be 0.1 to 35 parts by weight, or 1 to 30 parts by weight, or 5 to 30 parts by weight per 100 parts by weight of the total amount of monomer mixtures in the graft copolymer.

The amount of the monomer mixture (c) may be 0.1 to 40 parts by weight, or 1 to 30 parts by weight, or 5 to 25 parts by weight per 100 parts by weight of the total amount of monomer mixtures in the graft copolymer.

Further, the parts-by-weight ratio between the monomer mixtures (a) and (b) may be 10:90 to 60:40, or 10:90 to 40:60.

Also in the polymerization stages other than the polymerization stage (I) performed to obtain the graft copolymer used in one or more embodiments of the present invention, monomer polymerization may be performed in the presence of a chain transfer agent, if necessary. The total amount of a chain transfer agent used may be 0.01 to 6 parts by weight, or 0.1 to 4 parts by weight, or 0.2 to 2 parts by weight, or 0.24 to 1.6 parts by weight per 100 parts by weight of the total amount of monomer mixtures constituting the graft copolymer used in one or more embodiments of the present invention. According to one or more embodiments of the present invention, the "monomer mixtures constituting the graft copolymer (monomer mixtures in the graft copolymer)" refer to copolymerizable monomer components constituting the graft copolymer and having one double bond, that is, monomer components other than the polyfunctional monomers. For example, when the graft copolymer is obtained through the polymerization stages (I) to (III), the total amount of monomer mixtures constituting the graft copolymer refer to the total amount of the monomer mixture (a), the monomer mixture (b), and the monomer mixture (c). The chain transfer agent to be used in the polymerization stages other than the polymerization stage (I) is not particularly limited, and may be a generally-known chain transfer agent. Specific examples of the chain transfer agent include: a primary alkyl mercaptan-based chain transfer agent such as n-butyl mercaptan, n-octyl mercaptan, n-hexadecyl mercaptan, n-dodecyl mercaptan, or n-tetradecyl mercaptan; a secondary alkyl mercaptan-based chain transfer agent such as s-butyl mercaptan or s-dodecyl mercaptan; a tertiary alkyl mercaptan-based chain transfer agent such as t-dodecyl mercaptan or t-tetradecyl mercaptan; a mercaptan compound; a thioglycolate ester such as 2-ethylhexyl thioglycolate, ethylene glycol dithioglycolate, trimethylolpropane tris(thioglycolate), or pentaerythritol tetrakis(thioglycolate); thiophenol; tetraethylthiuram disulfide, pentane phenyl ethane; acrolein; methacrolein; allyl alcohol; carbon tetrachloride; ethylene bromide; a styrene oligomer such as α-methylstyrene dimer; and terpinolene. Among them, an alkyl mercaptan-based chain transfer agent and thiophenol may be used. These chain transfer agents may be used alone or in combination with two or more of them. Further, from the viewpoint of obtaining a graft copolymer having higher thermal stability, the chain transfer agent to be used in the polymerization stages other than the polymerization stage (I) may be a primary alkyl mercaptan-based chain transfer agent and/or a secondary alkyl mercaptan-based chain transfer agent. In one or more embodiments of the present invention, the same chain transfer agent as used in the polymerization stage (I) may be used. The amount of the primary alkyl mercaptan-based chain transfer agent and/or the secondary alkyl mercaptan-based transfer agent used in the polymerization stage (I) may be more than 50 wt % but 100 wt % or less, or 60 wt % or more but 100 wt % or less, or 70 wt % or more but 100 wt % or less, or 85 wt % or more but 100 wt % or less of the total amount of a chain transfer agent used. A graft copolymer obtained without using a chain transfer agent in the polymerization stages other than the polymerization stage (I) may be used as the graft copolymerin one or more embodiments of the present invention.

The graft copolymer used in one or more embodiments of the present invention can be produced by common emulsion polymerization using a known emulsifier. Examples of the emulsifier include: an anion surfactant such as sodium alkyl sulfonate, sodium alkylbenzene sulfonate, sodium dioctyl sulfosuccinate, sodium lauryl sulfate, a fatty acid sodium salt, or a phosphate ester salt such as sodium polyoxyethylene lauryl ether phosphate; and a nonionic surfactant. These surfactants may be used alone or in combination with two or more of them. From the viewpoint of improving the thermal stability of the resin composition comprising the acrylic resin and the graft copolymer and a molded article of the resin composition, emulsion polymerization may be performed using a phosphate ester salt (alkali metal phosphate ester salt or alkaline-earth metal phosphate ester salt) such as sodium polyoxyethylene lauryl ether phosphate.

From the viewpoint of improving the thermal stability of the resin composition comprising the acrylic resin and the graft copolymer and a molded article of the resin composition, a polymerization initiator to be used in the multistage polymerization for obtaining the graft copolymer used in one or more embodiments of the present invention may be one whose 10-hr half-life temperature is 100° C. or lower. The polymerization initiator is not particularly limited as long as its 10-hr half-life temperature is 100° C. or lower, but may be a persulfate such as potassium persulfate, sodium persulfate, or ammonium persulfate. In one or more embodiments of the present invention, potassium persulfate may be used.

Further, the polymerization may be performed by generating radicals substantially only by the pyrolysis mechanism of the polymerization initiator. An alternative to such a polymerization method in which radicals are generated by cleaving the polymerization initiator only by a pyrolysis mechanism is a polymerization method described in the example in Japanese Patent No. 3960631 in which an oxidizing agent such as ferrous sulfate and a reducing agent such as sodium formaldehyde sulfoxylate are used in combination as a redox initiator to generate radicals from a reagent that can generate radicals at low temperature. However, when such a redox initiator system is applied to one or more embodiments of the present invention, there is a case where a large amount of radicals are generated at a time. More specifically, when a polymer layer mainly containing a methacrylate ester is formed by polymerization using a redox initiator in at least the polymerization stage (I), a large amount of radicals are generated at a time, and therefore a bond that is cleaved by relatively low energy, such as a head-to-head bond, is formed in the polymer mainly containing a methacrylate ester. In this case, when the graft copolymer is exposed to high temperatures during molding processing or the like, such a bond is likely to become a starting point of zipping depolymerization so that the thermal stability of the graft copolymer is significantly impaired, which as a result may impair the color of a resulting molded article or cause defective molding such as mold staining. For this reason, the initiator may be cleaved only by pyrolysis without using the oxidizing agent and the reducing agent From the above viewpoint, the 10-hr half-life temperature of the polymerization initiator may be 100° C. or lower, or 90° C. or lower, or 80° C. or lower, or 75° C. or lower.

The polymerization initiator may be used for polymerization in at least the polymerization stage (I) performed to obtain the graft copolymer, and may be used for polymerization in the polymerization stage performed to obtain the graft copolymer in which a chain transfer agent such as n-octyl mercaptan is used. For example, the polymerization initiator is used for polymerization in all the polymerization stages performed to obtain the graft copolymer.

The total amount of the polymerization initiator used may be 0.01 to 1.0 part by weight, or 0.01 to 0.6 parts by weight, or 0.01 to 0.2 parts by weight per 100 parts by weight of the total amount of monomer mixtures constituting the graft copolymer. When the graft copolymer is obtained through the three polymerization stages (I) to (III), the amount of the polymerization initiator used in the polymerization stage (I) may be 0.01 to 1.85 parts by weight, the amount of the polymerization initiator used in the polymerization stage (II) may be 0.01 to 0.6 parts by weight, the amount of the polymerization initiator used in the polymerization stage (III) may be 0.01 to 0.90 parts by weight per 100 parts by weight of the monomer mixture used in each of the polymerization stages (I) to (III) and constituting the graft copolymer. In one or more embodiments of the present invention, the amount of the polymerization initiator used in the polymerization stage (I) is 0.01 to 0.2 parts by weight, the amount of the polymerization initiator used in the polymerization stage (II) is 0.01 to 0.4 parts by weight, and the amount of the polymerization initiator used in the polymerization stage (III) is 0.01 to 0.2 parts by weight per 100 parts by weight of the monomer mixture used in each of the polymerization stages (I) to (III).

Further, the amount of the polymerization initiator used in the polymerization stage (I) may be more than 1 wt % but 29 wt % or less of the total amount of the polymerization initiator used.

An indicator of the thermal stability of the graft copolymer may be a weight loss temperature determined by heating the polymer. The graft copolymer used in one or more embodiments of the present invention may have a 1% weight loss temperature of 270° C. or higher and a 5% weight loss temperature of 310° C. or higher as measured by thermal stability analysis (TGA). The 1% weight loss temperature may be 275° C. or higher, or 280° C. or higher, or 290° C. or higher. The 5% weight loss temperature may be 315° C. or higher, or 320° C. or higher, or 330° C. or higher. When the graft copolymer has a 1% weight loss temperature of 270° C. or higher and a 5% weight loss temperature of 310° C. or higher as measured by thermal stability analysis, the resin composition (molded article or film) comprising the acrylic resin and the graft copolymer has an excellent color. Further, when the graft copolymer has a 1% weight loss temperature of 290° C. or higher and a 5% weight loss temperature of 330° C. or higher, the resin composition (molded article or film) comprising the acrylic resin and the graft copolymer has an excellent color. (Here, when the YI value of the molded article or the film is lower, the molded article or the film has lower yellowness and is therefore regarded as having an excellent color).

In one or more embodiments of the present invention, the gel content of the graft copolymer is represented as the weight ratio of a component insoluble in methyl ethyl ketone.

The gel content of the graft copolymer used in one or more embodiments of the present invention may be 65% or higher, or 68% or higher, or 70% or higher. Further, the gel content is 84% or lower, or 83% or lower, or 82% or lower, or 80% or lower. If the gel content is lower than 65%, a resulting molded article is less likely to have adequate impact resistance, or a resulting acrylic resin film is less likely to have adequate mechanical properties such as bending resistance, cracking resistance during slitting, and cracking resistance during punching. If the gel content exceeds 84%, there is a case where the resin composition according to one or more embodiments of the present invention is poor in fluidity during molding.

The average particle diameter of a polymer formed up to the polymerization stage (II) by performing the polymerization stages (I) and (II) in obtaining the graft copolymer used in one or more embodiments of the present invention may be 50 to 400 nm, or 80 to 350 nm, or 100 to 320 nm, or 120 to 300 nm. Here, the average particle diameter is determined by measuring 546-nm light scattered from a polymer latex with the use of a spectrophotometer.

According to one or more embodiments of the present invention, the ratio of a polymer obtained after the polymerization stage (II) and grafted on a cross-linked structure polymer that is obtained by performing up to the polymerization stage (II) including the polymerization stages (I) and (II) and that constitutes the graft copolymer (the outermost polymer of the cross-linked structure polymer is a soft polymer obtained by performing the polymerization stage (II)) is determined as a graft ratio of the graft copolymer.

The graft ratio of the graft copolymer is represented as a weight ratio of a polymer obtained after the polymerization stage (II) and grafted on a cross-linked structure polymer that is obtained by performing up to the polymerization stage (II) including the polymerization stages (I) and (II) and that constitutes the graft copolymer when the weight of the cross-linked structure polymer is defined as 100.

The graft ratio of the graft copolymer used in one or more embodiments of the present invention may be 20% or lower, or 10% or lower, or 5% or lower. Further, the graft ratio is −20% or higher, or −10% or higher. Here, based on a calculation formula for determining the graft ratio which will be described later, a negative graft ratio means that even after a cross-linked structure polymer is obtained by performing up to the polymerization stage (II), a polymer component that is not cross-linked to the cross-linked structure polymer is present.

The resin composition according to one or more embodiments of the present invention comprising the acrylic resin and the graft copolymer can offer excellent color, transparency, and impact strength even when the graft ratio of the multistage-polymerized polymer is low.

From the viewpoint of allowing the graft copolymer to have balanced physical properties, the average particle diameter of the graft copolymer in an obtained latex may be 55 to 440 nm, or 85 to 380 nm, or 110 to 350 nm. If the average particle diameter is less than 55 nm, a resulting molded article is less likely to have adequate impact resistance, or a resulting acrylic resin film is less likely to have adequate mechanical properties such as bending resistance, cracking resistance during slitting, and cracking resistance during punching. If the average particle diameter exceeds 440 nm, a resulting molded article or film is less likely to have excellent transparency.

The thus obtained graft copolymer latex is spray-dried to obtain a powdery graft copolymer. Alternatively, as generally known, the graft copolymer latex may be coagulated by adding a salt or an acid, heat-treated, filtered, washed, and then dried to obtain a powdery graft copolymer. For example, the graft copolymer latex is coagulated using a salt. The salt to be used is not particularly limited, but may be a bivalent salt such as a calcium salt such as calcium chloride or a magnesium salt such as a magnesium chloride or magnesium sulfate, and may be a magnesium salt such as magnesium chloride or magnesium sulfate.

If necessary, an antioxidant or an ultraviolet absorber usually added during coagulation may be added.

Further, if necessary, the graft copolymer latex may be filtered through a filter, a mesh, or the like before coagulation to remove fine polymerization scale, which makes it possible to reduce fish-eyes or foreign objects resulting from such fine polymerization scale to improve the appearance of a molded article and a film according to one or more embodiments of the present invention.

In general, the mechanical strength of an acrylic resin is improved by adding a soft polymer. However, in this case, there is a drawback that the soft polymer is homogeneously mixed with a matrix resin (here corresponding to the acrylic resin) so that a resulting molded article has low heat resistance. On the other hand, when a graft copolymer is added which has a soft cross-linked polymer layer and a hard polymer layer (also called multistage-polymerized polymer, multilayer structure polymer, or core-shell polymer), a resulting molded article has a discontinuous sea-island structure in which the soft cross-linked polymer layer corresponds to "island" and the matrix resin and the hard polymer layer coating the soft cross-linked polymer layer correspond to "sea". Therefore, the graft copolymer is effective at improving mechanical strength almost without reducing heat resistance. The soft cross-linked polymer layer sometimes has a hard cross-linked polymer layer on the inner side thereof. Further, the soft cross-linked polymer generally has a composition different from that of the matrix resin, which makes it difficult to uniformly disperse the soft cross-linked polymer in the matrix resin. Therefore, the soft cross-linked polymer causes a deterioration in optical properties such as transparency or defects such as fish-eyes, and further causes a reduction in mechanical strength. However, in the case of the graft copolymer having both a soft cross-linked polymer layer and a hard polymer layer (also called multistage-polymerized polymer, multilayer structure polymer, or core-shell polymer), as described above, the soft cross-linked polymer layer can be uniformly dispersed in the matrix.

From the viewpoint of transparency and mechanical strength, the average particle diameter of "islands (domains)" in the resin composition (molded article or film) in which the graft copolymer is dispersed in the acrylic resin may be 50 to 400 nm. From the viewpoint of mechanical strength, the average particle diameter may be 80 nm or more, or 100 nm or more. On the other hand, from the viewpoint of transparency, the average particle diameter is 350 nm or less, or 320 nm or less. Here, the average particle diameter of islands (domains) refers to the average particle diameter of 30 rubber particles determined in the following manner. An ultrathin slice is cut out from the molded article or the film with the use of a diamond knife. Then, the slice is stained with a staining agent such as ruthenium tetraoxide or osmium tetraoxide, and its image observed with a scanning electron microscope is taken. Then, 30 rubber particles appearing in their entirety in the image as islands (domains) are randomly selected, the particle diameter of each of the rubber particles is measured, and the average particle diameter of these rubber particles is determined.

According to one or more embodiments of the present invention, the term "soft" means that the glass transition temperature of the polymer is lower than 20° C. From the viewpoint of enhancing the ability of the soft layer to absorb impact and enhancing the effect of improving impact resistance such as cracking resistance, the glass transition temperature of the polymer may be lower than 0° C., or lower than −20° C.

In one or more embodiments of the present invention, the term "hard" means that the glass transition temperature of the polymer is 20° C. or higher. If the glass transition temperature of the polymer (I) or (III) is lower than 20° C., the heat resistance of the resin composition, the molded article, or the film according to one or more embodiments of the present invention is reduced, or a cross-linked structure-containing polymer is likely to become coarse or agglomerated during the production of the cross-linked structure-containing polymer.

In one or more embodiments of the present invention, the glass transition temperature of the "soft" or "hard" polymer is calculated by the FOX equation using values described in Polymer Hand Book (J. Brandrup, Interscience 1989) (for example, the glass transition temperature of polymethyl methacrylate is 105° C., and the glass transition temperature of polybutyl acrylate is −54° C.).

In one or more embodiments of the present invention, the polymer (I) obtained in the polymerization stage (I) is a hard polymer, the polymer (II) obtained in the polymerization stage (II) is a soft polymer, and the polymer (III) obtained in the polymerization stage (III) is a hard polymer. Further, the polymer (IV) obtained in the polymerization stage (IV) is a hard polymer.

The graft copolymer obtained in the above-described manner offers an excellent balance of appearance, transparency, weather resistance, luster, processability, and thermal stability, and can be blended with various acrylic resins. When the graft copolymer is blended with an acrylic resin, a resin composition excellent in thermal stability, weather resistance, luster, and processability can be provided without impairing excellent color, appearance, and transparency characteristic of acrylic resin.

(Resin Composition)

The mixing ratio of the acrylic resin and the graft copolymer varies depending on the intended use of a resulting molded article or film, but 40 to 98 parts by weight of the acrylic resin and 60 to 2 parts by weight of the graft copolymer (per 100 parts by weight of the total amount of the acrylic resin and the graft copolymer) may be mixed, 50 to 95 parts by weight of the acrylic resin and 50 to 5 parts by weight of the graft copolymer may be mixed, and 55 to 95 parts by weight of the acrylic resin and the 45 to 5 parts by weight of the graft copolymer may be mixed. If the amount of the acrylic resin is less than 40 parts by weight, there is a case where properties characteristic of the acrylic resin are lost, and if the amount of the acrylic resin exceeds 98 parts by weight, there is a case where mechanical strength such as impact strength is not sufficiently improved.

A mixing method used to prepare the resin composition according to one or more embodiments of the present invention is not particularly limited, and various known methods such as extrusion kneading and roll kneading may be used.

From the viewpoint of thermal stability, when the glass transition temperature of the acrylic resin is 115° C. or higher, the amount of residual volatile matter contained in the resin composition according to one or more embodiments of the present invention may be 700 ppm or less, and when the glass transition temperature of the acrylic resin is lower than 115° C., the amount of residual volatile matter contained in the resin composition according to one or more embodiments of the present invention may be 8000 ppm or less.

Here, the amount of residual volatile matter is measured by gas chromatography in the following manner. The resin composition is melt-kneaded at a resin temperature of 265° C. to obtain a resin strand, and the resin strand is introduced into a capilograph (furnace temperature: 270° C., piston fall rate: 0.5 m/min, capillary diameter: 10 mm, ribbon die with a slit size of 0.35 mm×5 mm) and discharged at a low speed to obtain a ribbon-shaped resin. The residual volatile matter of the ribbon-shaped resin is measured by gas chromatography. The measurement conditions will be described later in detail.

If necessary, the resin composition according to one or more embodiments of the present invention may contain any known additive such as a light stabilizer, a UV absorber, a heat stabilizer, a delustering agent, a light diffusing agent, a coloring agent, a dye, a pigment, an antistatic agent, a heat reflecting agent, a lubricant, a plasticizer, a UV absorber, a stabilizer, or a filler, or another resin such as a polyethylene terephthalate resin or a polybutylene terephthalate resin.

From the viewpoint of adjusting orientation birefringence, inorganic fine particles having birefringence described in Japanese Patent Nos. 3648201 and 4336586 or a low molecular compound having birefringence and a molecular weight of 5000 or less, or 1000 or less described in Japanese Patent No. 3696649 may be appropriately added to the resin composition according to one or more embodiments of the present invention.

When the color of a molded article (3 mm thick) obtained by molding the resin composition according to one or more embodiments of the present invention is expressed as, for example, transparent YI (yellowness index), the transparent YI may be 2 or less, or 1 or less, or 0.75 or less, or 0.5 or less, or 0.2 or less.

Further, the molded article obtained by molding the resin composition according to one or more embodiments of the present invention has high mechanical strength, especially high impact resistance. The Izod impact strength of the molded article as one of the indicators of impact resistance is 3.0 KJ/m$^2$ or more, or 3.5 KJ/m$^2$ or more, or 5.0 KJ/m$^2$ or more, or 6.0 $KJ/m^2$ or more, in which case the molded article can offer excellent impact resistance while maintaining high transparency and excellent color.

The resin composition and the molded article according to one or more embodiments of the present invention can be used for various purposes by taking advantage of their optical properties such as color, appearance, and transparency and mechanical strength such as impact resistance. For example, the resin composition and the molded article according to one or more embodiments of the present invention can be used for car headlights, tail lamp lenses, inner lenses, instrument covers, and sunroofs for use in the field of vehicles; display-related members such as heads-up displays and display front panels for use in the field of displays; road signs, bathroom fitments, floor materials, translucent panels for roads, lenses for double-glazing, lighting windows, carports, lenses for lighting, lighting covers, and sidings for building materials for use in the fields of architecture and construction materials; microwave cooking vessels (dishes); housings for home appliances; toys; sunglasses; and stationery.

(Acrylic Resin Film)

An acrylic resin film according to one or more embodiments of the present invention may be obtained by molding the resin composition according to one or more embodiments of the present invention by a known molding method. For example, the acrylic resin film according to one or more embodiments of the present invention is obtained by appropriately molding the resin composition according to one or more embodiments of the present invention by a common melt extrusion method such as an inflation method or a T-die extrusion method, a calender method, or a solvent casting method. Particularly, molding by a melt extrusion method using no solvent is significant because the resin composition according to one or more embodiments of the present invention has excellent thermal stability.

Hereinbelow, a method for producing an acrylic resin film by melt extrusion molding will be described in detail as one example of a method for producing the acrylic resin film according to one or more embodiments of the present invention.

When the acrylic resin composition according to one or more embodiments of the present invention is molded into a film by melt extrusion, the acrylic resin composition according to one or more embodiments of the present invention is first supplied to an extruder and melted by heating. When the acrylic resin composition is supplied to an extruder, each of the components of the acrylic resin composition may be directly supplied as particles to the extruder, or pellets of the resin composition previously prepared by the extruder may be supplied to the extruder.

The resin composition according to one or more embodiments of the present invention is subjected to preliminary drying before supplied to the extruder. Such preliminary drying makes it possible to prevent the resin extruded from the extruder from foaming.

A method of the preliminary drying is not particularly limited. For example, the raw material (i.e., the acrylic resin composition according to one or more embodiments of the present invention) formed into pellets or the like may be dried in a hot-air drier or the like.

The extruder for molding the resin composition according to one or more embodiments of the present invention into film may have one or more devolatilizers for removing volatile matter generated during melting by heating. By providing such a devolatilizer, it is possible to reduce deterioration of film appearance caused by foaming or decomposition/deterioration reaction of the resin.

When the resin composition according to one or more embodiments of the present invention is molded into a film by melt extrusion, an inert gas such as nitrogen or helium may be supplied to a cylinder of the extruder together with the resin material. The supply of an inert gas reduces the concentration of oxygen in a system, which makes it possible to reduce decomposition caused by oxidation degradation, cross-linking, degradation of appearance or quality such as yellowing.

Then, the resin composition melted by heating in the extruder is supplied through a gear pump or a filter to a T-die. At this time, the use of a gear pump makes it possible to improve the uniformity of the amount of the resin to be extruded and to reduce thickness variation. On the other hand, the use of a filter makes it possible to remove foreign matter in the resin composition to obtain a film having an excellent appearance without defects.

The filter to be used may be a stainless steel leaf disc filter capable of removing foreign matter from a melted polymer, and a filter element to be used may be of fiber type, powder type, or complex type thereof. The filter can be suitably used for an extruder or the like for use in pelletization or film formation.

Then, the resin composition supplied to the T-die is extruded through the T-die as a sheet-shaped melted resin. Then, the sheet-shaped melted resin is cooled using two or more cooling rolls. Usually, the T-die is arranged so that the melted resin comes into contact with the first casting roll provided on the most upstream side (on the side close to the die). In general, two cooling rolls are used. The temperature of the casting roll may be 50° C. to 160° C., or 60° C. to 120° C. Then, the film is stripped from the casting roll, passed between nip rolls, and rolled up.

Examples of a method for bringing the resin into close contact with the casting roll include a touch roll method, a nip roll method, an electrostatic application method, an air knife method, a vacuum chamber method, a calender method, and a sleeve method. An appropriate method is selected according to the thickness or intended use of the film. When an optical film having a low optical distortion is formed, a touch roll method may be used. In the touch roll method, an elastic roll having a double cylindrical structure using a metal sleeve may be used. The temperature of the touch roll may be 40° C. to 120° C., or 50° C. to 100° C.

When the resin composition is molded into a film, if necessary, both surfaces of the film may be brought into contact with (the film may be sandwiched between) rolls or metal belts, especially rolls or metal belts heated to a temperature around the glass transition temperature, at the same time so that the film can have more excellent surface properties.

One of the two cooling rolls sandwiching the sheet-shaped melted resin may be a rigid metal roll having a smooth surface, and the other cooling roll may be a flexible roll having an elastically-deformable metal elastic external cylinder having a smooth surface.

When the sheet-shaped melted resin is cooled by sandwiching between such rigid metal roll and flexible roll having a metal elastic external cylinder to form a film, surface micro-irregularities, die lines, or the like are corrected so that the film can have a smooth surface and a thickness variation of 5 μm or less.

Even when the rigid metal roll and the flexible roll are used, there is a case where when a thin film is formed, the surfaces of the cooling rolls come into contact with each other so that the outer surfaces of the cooling rolls are damaged or the cooling rolls themselves are broken because both the cooling rolls have a metal surface.

Therefore, when the sheet-shaped melted resin is sandwiched between such two cooling rolls as described above to form a film, the sheet-shaped melted resin is first sandwiched between the two cooling rolls and cooled to obtain a film. It is to be noted that the term "cooling roll" used herein includes the meaning of "touch roll" and "cooling roll".

The thickness of the acrylic resin film according to one or more embodiments of the present invention is not particularly limited, but may be 500 μm or less or 300 μm or less, or 200 μm or less. Further, the thickness may be 10 μm or more, or 30 μm or more, or 50 μm or more, or 60 μm or more. When the film thickness is within the above range, there is an advantage that, when vacuum molding is performed using the film, deformation is less likely to occur and a deep-drawn portion is less likely to be broken, and further the film can have uniform optical characteristics and excellent transparency. On the other hand, if the film thickness exceeds the above upper limit, the film is non-uniformly cooled after molding and therefore tends to have non-uniform optical properties. If the film thickness is less than the above lower limit, there is a case where the film is difficult to be handled.

When the acrylic resin film according to one or more embodiments of the present invention has a thickness of 80 μm, the total light transmittance of the acrylic resin film may be85% or higher, or 88% or higher, or 90% or higher. When the total light transmittance is within the above range, the acrylic resin film has high transparency, and is therefore suitable for optical members required to have light permeability, decorative applications, interior applications, and vacuum molding.

The acrylic resin film according to one or more embodiments of the present invention may have a glass transition temperature of 90° C. or higher, or 100° C. or higher, or 110° C. or higher, or 115° C. or higher, or 120° C. or higher, or 124° C. or higher. When the glass transition temperature is within the above range, the acrylic resin film can have excellent heat resistance.

When the acrylic resin film according to one or more embodiments of the present invention has a thickness of 80 μm, the haze of the acrylic resin film may be 2.0% or less, or 1.5% or less, or 1.3% or less, or 1.0% or less. Further, the inner haze of the film is 1.5% or less, or 1.0% or less, or 0.5% or less, or 0.3% or less. When the haze and the inner haze are within their respective ranges described above, the acrylic resin film has high transparency, and is therefore suitable for optical members required to have light permeability, decorative purposes, interior purposes, and vacuum molding. It is to be noted that the haze includes the haze of inside of the film and the haze of surface (outside) of the film which are referred to as inner haze and outer haze, respectively.

The acrylic resin film according to one or more embodiments of the present invention can be used also as an optical film. Particularly, when the acrylic resin film is used as a polarizer protective film, the acrylic resin film may have small optical anisotropy. Particularly, the acrylic resin film may have small optical anisotropy not only in its in-plane directions (length direction, width direction) but also in its thickness direction. That is, the absolute value of the in-plane phase difference and the absolute value of the thickness-direction phase difference of the acrylic resin film may be both small More specifically, the absolute value of the in-plane phase difference may be 10 nm or less, or 6 nm or less, or 5 nm or less, or 3 nm or less. Further, the absolute value of the thickness-direction phase difference may be 50 nm or less, or 20 nm or less, or 15 nm or less, or 10 nm or less, or 5 nm or less. The film having such phase differences is suitable for use as a polarizer protective film of a polarizer in a liquid crystal display device. On the other hand, if the absolute value of the in-plane phase difference of the film exceeds 10 nm or the absolute value of the thickness-direction phase difference of the film exceeds 50 nm, there is a case where, when the film is used as a polarizer protective film of a polarizer in a liquid crystal display device, reduction in the contrast of the liquid crystal display device may occur.

Phase differences are indicator values calculated based on birefringence, and an in-plane phase difference (Re) and a thickness-direction phase difference (Rth) can be calculated by the following formulas, respectively. In the case of an ideal film that is completely optically isotropic in three-dimensional directions, its in-plane phase difference Re and thickness-direction phase difference Rth are both 0.

$$Re=(nx-ny)\times d$$

$$Rth=((nx+ny)/2-nz)\times d$$

In the above formulas, nx, ny, and nz represent refractive indexes in X, Y, and Z axis directions, respectively, at the time when an in-plane extension direction (orientation direction of polymer chains) is defined as an X axis, a direction orthogonal to the X axis is defined as a Y axis, and the thickness direction of a film is defined as a Z axis. Further, d represents the thickness of the film and nx−ny represents orientation birefringence. It is to be noted that in the case of a melt-extruded film, the MD direction corresponds to the X axis, and in the case of a stretched film, the stretching direction corresponds to the X axis.

The orientation birefringence of the acrylic resin film according to one or more embodiments of the present invention may be $-2.6\times10^{-4}$ to $2.6\times10^{-4}$, or $-2.1\times10^{-4}$ to $2.1\times10^{-4}$, or $-1.7\times10^{-4}$ to $1.7\times10^{-4}$, or $-1.6\times10^{-4}$ to $1.6\times10^{-4}$, or $-1.5\times10^{-4}$ to $1.5\times10^{-4}$, or $-1.0\times10^{-4}$ to $1.0\times10^{-4}$, or $-0.5\times10^{-4}$ to $0.5\times10^{-4}$, or $-0.2\times10^{-4}$ to $0.2\times10^{-4}$. When the orientation birefringence is within the above range, birefringence does not occur during molding processing so that stable optical properties can be achieved. Further, the acrylic resin film is very suitable also as an optical film for use in a liquid crystal display or the like.

(Stretching)

The acrylic resin film according to one or more embodiments of the present invention has high toughness and high flexibility even as an unstretched film. However, the acrylic resin film may further be stretched to improve mechanical strength and film thickness accuracy.

When the acrylic resin film according to one or more embodiments of the present invention is a stretched film, the stretched film (uniaxially stretched film or biaxially stretched film) can be produced by once molding the resin composition according to one or more embodiments of the present invention into an unstretched film and then uniaxially or biaxially stretching the unstretched film.

In this description, for convenience of description, a film that is obtained by molding the resin composition according to one or more embodiments of the present invention but is not yet subjected to stretching, that is, an unstretched film is referred to as "raw film".

When stretched, a raw film may be continuously stretched immediately after molding, or may be stretched after once stored or transferred after molding.

It is to be noted that when stretched immediately after molding, a raw film may be stretched within a very short time (in some cases, instantaneously) after molding or after a lapse of time from production in the process of film production.

When the acrylic resin film according to one or more embodiments of the present invention is produced as a stretched film, the raw film does not need to be in a complete film state as long as the raw film is kept in a film state to the extent that it can be stretched.

A method for stretching the raw film is not particularly limited, and any conventionally-known stretching method may be used. Specific examples of such a method include transverse stretching using a tenter, longitudinal stretching using rolls, and successive biaxial stretching in which transverse stretching and longitudinal stretching are successively performed in combination. Alternatively, a simultaneous biaxial stretching method may be used in which longitudinal stretching and transverse stretching are performed at the same time, or a method may be used in which longitudinal stretching using rolls is performed and then transverse stretching using a tenter is performed.

When stretched, the raw film may be once preheated to a temperature higher than a stretching temperature by 0.5° C. to 5° C., or 1° C. to 3° C. and then cooled to the stretching temperature before stretching.

By preheating the raw film to a temperature within the above range, it is possible to accurately maintain the thickness of the raw film, or it is possible to prevent a resulting stretched film from having a low thickness accuracy or a thickness variation. Further, it is also possible to prevent the raw film from adhering to rolls or sagging under its own weight On the other hand, if the preheating temperature of the raw film is too high, an adverse effect tends to occur, such as adhesion of the raw film to rolls or sagging of the raw film under its own weight. Further, if the difference between the preheating temperature and the stretching temperature of the raw film is small, the raw film before stretching tends to be difficult to maintain thickness accuracy, or a resulting stretched film tends to have a large thickness variation or a low thickness accuracy.

The stretching temperature at which the raw film is stretched is not particularly limited, and may be changed according to mechanical strength, surface properties, and thickness accuracy required of a stretched film to be produced.

When the glass transition temperature of the raw film determined by a DSC method is defined as Tg, the stretching temperature may be generally in the range of (Tg−30° C.) to (Tg+30° C.), or in the range of (Tg−20° C.) to (Tg+20° C.), or in the range of (Tg) to (Tg+20° C.).

When the stretching temperature is within the above range, it is possible to reduce the thickness variation of a resulting stretched film, and it is also possible to improve the mechanical properties of the film, such as percentage of elongation, tear propagation strength, and resistance to flexural fatigue. Further, it is also possible to avoid trouble such as adhesion of the film to rolls.

On the other hand, if the stretching temperature is higher than the above upper limit, a resulting stretched film tends to have a large thickness variation, or the mechanical properties of the film such as percentage of elongation, tear propagation strength, and resistance to flexural fatigue tend not to be sufficiently improved. Further, trouble such as adhesion of the film to rolls tends to easily occur.

Further, if the stretching temperature is lower than the above lower limit, a resulting stretched film tends to have a high haze, or in an extreme case, tearing or cracking of the film tends to occur during the production process.

When the raw film is stretched, its stretching ratio is not particularly limited, and may be determined according to mechanical strength, surface properties, and thickness accuracy required of a stretched film to be produced. Depending on the stretching temperature, the stretching ratio may be generally selected in the range of 1.1 times to 3 times, or in the range of 1.3 times to 2.5 times, or in the range of 1.5 times to 2.3 times. When the stretching ratio is within the above range, the mechanical properties of the film, such as percentage of elongation, tear propagation strength, and resistance to flexural fatigue can be significantly improved.

(Applications)

If necessary, the surface gloss of the acrylic resin film according to one or more embodiments of the present invention can be reduced by a known method. This can be achieved by, for example, kneading the resin composition with an inorganic filler or cross-linkable polymer particles. Alternatively, the film obtained may be embossed to reduce its surface gloss.

If necessary, the acrylic resin film according to one or more embodiments of the present invention may be laminated on another film with an adhesive or coated with a surface coating layer such as a hard coat layer before use.

The acrylic resin film according to one or more embodiments of the present invention can be used for various purposes by taking advantage of its properties such as heat resistance, transparency, and flexibility. For example, the acrylic resin film according to one or more embodiments of the present invention can be used for interior and exterior of cars, personal computers, mobile devices, and solar batteries; solar battery backsheets; image taking lenses for cameras, VTRs, and projectors, finders, filters, prisms, Fresnel lenses, lens covers and the like for use in the field of imaging; lenses such as pick-up lenses for optical discs in CD players, DVD players, MD players and the like; optical discs such as CDs, DVDs, and MDs for use in the field of optical recording; films for organic EL devices, films for liquid crystal displays such as light guide plates, diffuser plates, backsheets, reflection sheets, polarizer protective films, and polarizing film transparent resin sheets, phase difference films, light diffusion films, and prism sheets, and surface protective films for use in the field of information devices; optical fibers, optical switches, optical connectors and the like for use in the field of optical communications; car headlights, tail lamp lenses, inner lenses, instrument covers, sunroofs and the like for use in the field of vehicles; eyeglasses, contact lenses, lenses for endoscopes, and medical supplies requiring sterilization for use in the field of medical devices; road signs, bathroom fitments, floor materials, translucent panels for roads, lenses for double glazing, lighting windows, carports, lenses for lighting, lighting covers, sidings for construction materials and the like for use in the fields of architecture and construction materials; microwave cooking vessels (dishes); housings for home appliances; toys; sunglasses; and stationery. The acrylic resin film according to one or more embodiments of the present invention can be used also as a substitute for a molded article using a transfer foil sheet The acrylic resin film according to one or more embodiments of the present invention can be used by laminating it on a base material such as a metal or plastic. Examples of a method for laminating the acrylic resin film include lamination molding, wet lamination in which an adhesive is applied onto a metal plate, such as a steel plate, and then the film is placed on and bonded to the metal plate by drying, dry lamination, extrusion lamination, and hot melt lamination.

Examples of a method for laminating the film on a plastic part include insert molding or laminate injection press molding in which the film is placed in a mold and then a resin is injected into the mold, and in-mold molding in which the preliminarily-molded film is placed in a mold and then a resin is injected into the mold.

A laminate using the acrylic resin film according to one or more embodiments of the present invention can be used for alternatives to painting such as interior or exterior materials for cars, building materials such as window frames, bathroom fitments, wallpapers, and floor materials, daily goods, housings for furniture and electric devices, housings for OA equipment such as facsimiles, notebook computers, and copy machines, front panels for liquid crystal displays in terminals such as mobile phones, smartphones, and tablets, optical members such as lighting lenses, car headlights, optical lenses, optical fibers, optical discs, and light guide plates for liquid crystal displays, parts of electric or electronic devices, medical supplies requiring sterilization, toys, and recreational goods.

Particularly, the acrylic resin film according to one or more embodiments of the present invention excellent in heat resistance and optical properties is suitable as an optical film, and therefore can be used for various optical members. For example, the acrylic resin film according to one or more embodiments of the present invention can be used for known optical applications such as front panels for liquid crystal displays in terminals such as mobile phones, smartphones and tablets, lighting lenses, car headlights, optical lenses, optical fibers, optical discs, liquid crystal display peripherals such as light guide plates for liquid crystal displays, diffuser plates, backsheets, reflection sheets, polarizing film transparent resin sheets, phase difference films, optical diffusion films, prism sheets, surface protective films, optical isotopic films, polarizer protective films, and transparent conductive films, organic EL device peripherals, and optical communication fields.

EXAMPLES

Hereinbelow, one or more embodiments of the present invention will be described more specifically with reference to examples, but is not limited to these examples. The terms "part(s)" and "%" as used hereinafter refer to "part(s) by weight" and "% by weight", respectively, unless otherwise specified.

(Average Particle Diameter of Polymer Obtained by Performing Up to Polymerization Stage (II) in Obtaining Graft Copolymer)

The average particle diameter of a polymer was measured using a polymer latex obtained by performing polymerization up to the polymerization stage (II). More specifically, the average particle diameter was determined by measuring 546-nm light scattered from the polymer latex with the use of Ratio Beam Spectrophotometer U-5100 manufactured by Hitachi High-Technologies Corporation.

(Polymerization Conversion Ratio)

The polymerization conversion ratio of a polymer obtained by polymerization was determined in the following manner. A sample containing a polymer (polymer latex) was obtained from a polymerization system, and about 2 g of the sample was weighed. The thus obtained sample was dried at 120° C. for 1 hour in a hot-air drier, and was then accurately weighed to determine the weight of solid matter. Then, the ratio between the results of accurate measurement before and after drying was determined as the solid content of the sample. Finally, a polymerization conversion ratio was calculated by the following calculation formula using the solid content. It is to be noted that in the calculation formula, the polyfunctional monomer and the chain transfer agent were regarded as monomers charged. Polymerization conversion ratio (%)={(total weight of raw materials charged×solid content−total weight of raw materials other than water and monomers)/weight of monomers charged}×100

(Gel Content, Graft Ratio)

First, 2 g of an obtained graft copolymer was dissolved in 50 mL of methyl ethyl ketone. Then, the solution was centrifuged at 30000 rpm for 1 hour using a centrifugal separator (CP60E manufactured by Hitachi Koki Co., Ltd.) to be separated into an insoluble fraction and a soluble fraction (three sets of centrifugation were performed in total). A gel content and a graft ratio were calculated by the following formulas using the weight of the obtained insoluble fraction.

Gel content (%)={(weight of methyl ethyl ketone-insoluble fraction)/(weight of methyl ethyl ketone-insoluble fraction+weight of methyl ethyl ketone-soluble fraction)}×100

Graft ratio (%)={(weight of methyl ethyl ketone-insoluble fraction−weight of cross-linked structure polymer)/(weight of cross-linked structure polymer}×100

It is to be noted that the weight of a cross-linked structure polymer refers to the weight of monomers charged that constitute the cross-linked structure polymer. In the case of Examples in this description, the weight of a cross-linked structure polymer refers to the total weight of monomers charged in the polymerization stages (I) and (II).

(Evaluation of Thermal Stability)

<Weight Loss Temperature of Graft Copolymer>

The 1% weight loss temperature and 5% weight loss temperature of a graft copolymer were measured in the following manner. First, an obtained graft copolymer was preliminarily dried at 80° C. overnight. Then, the temperature of the preliminarily-dried graft copolymer was increased from 30° C. to 465° C. at a rate of 10° C./min in a nitrogen stream with the use of EXSTAR EG/DTA7200 manufactured by SII Technology to measure the loss of weight at this time. The temperature at which the weight loss reached 1% of the initial weight is defined as 1% weight loss temperature, and the temperature at which the weight loss reached 5% of the initial weight is defined as 5% weight loss temperature.

(Tensile Elongation)

A tensile test was performed in accordance with JIS K 7161 to measure tensile stress at yield, tensile stress at break, tensile elongation, and elasticity at a test speed of 5 mm/min. Among them, tensile elongation is shown in Table 3.

(Izod Test)

An Izod test (temperature: 23° C., humidity: 50%) was performed in accordance with ASTM D-256.

(Total Light Transmittance and Haze Value)

The total light transmittance and haze value (Haze) of a resin composition (molded article) or a film were measured by a method described in JIS K7105 with the use of NDH-300A manufactured by NIPPON DENSHOKU INDUSTRIES CO., LTD.

An inner haze value was measured in the same manner as described above except that a film was placed in a quartz cell containing pure water. That is, the difference is whether measurement is performed in air or in water.

(YI(Yellowness index))

A color meter (ZE-2000 manufactured by NIPPON DENSHOKU INDUSTRIES CO., LTD.) in accordance with JIS Z8722 was used.

(Melt Flow Rate (MFR))

A melt flow rate was measured in accordance with JIS K 7210 at a test temperature of 230° C. and a load of 3.8 kg.

(HDT)

A deflection temperature under load was measured in accordance with JIS K 7191 at a load of 1.86 MPa.

(Glass Transition Temperature)

The temperature of a sample was once increased to 200° C. at a rate of 25° C./min using a differential scanning calorimeter (DSC) SSC-5200 manufactured by Seiko Instruments Inc., held at 200° C. for 10 minutes, and reduced to 50° C. at a rate of 25° C./min for preliminary adjustment. Then, the DSC curve of the sample was measured while the temperature of the sample was increased to 200° C. at a temperature increase rate of 10° C./min. The value of integral of the obtained DSC curve was determined (DDSC), and a glass transition temperature was determined from its maximum point (Film Thickness)

The film thickness of a film was measured using a digimatic indicator (manufactured by Mitsutoyo Corporation).

(Orientation Birefringence, In-Plane Phase Difference Re, and Thickness-Direction Phase Difference Rth)

A 40 mm×40 mm test piece was cut out from an unstretched film (raw film) having a film thickness of 80 μm obtained in each of Examples and Comparative Examples. The orientation birefringence and the in-plane phase difference Re of the test piece were measured using an automatic birefringence meter (KOBRA-WR manufactured by Oji Scientific Instruments) at a temperature of 23±2° C., a humidity of 50±5%, a wavelength of 590 nm, and an incident angle of 0°.

Three-dimensional refractive indexes nx, ny, and nz were determined from the thickness d of the test piece measured by a digimatic indicator (manufactured by Mitsutoyo Corporation), the refractive index n of the test piece measured by an Abbe refractometer (3T manufactured by ATAGO Co., Ltd.), the in-plane phase difference Re of the test piece measured by an automatic birefringence meter at a wavelength of 590 nm, and the phase difference value of the test piece in a 40° inclined direction to calculate the thickness-direction phase difference of the test piece using the formula: $Rth=((nx+ny)/2-nz)\times d$.

(Evaluation of MIT)

The bending resistance of a film was measured by a method described in JIS C5016 using an MIT type folding endurance tester manufactured by Toyo Seiki Seisaku-sho, Ltd. The measurement was performed under conditions of a measuring angle of 135°, a speed of 175 times/min, R=0.38, and a load of 200 g.

(Residual Volatile Matter Content in Resin Composition)

Pellets obtained by kneading an acrylic resin and a graft copolymer in a ratio described in Table 4 were fed into CAPILOGRAPH 1D manufactured by Toyo Seiki Seisaku-sho Co., Ltd. having a furnace temperature of 270° C., and a ribbon-shaped resin was discharged at a low speed for 90 minutes through a ribbon die having a capillary diameter of 10 mm and a slit size of 0.35×5 mm by pushing down a piston at a rate of 0.5 m/min.

The residual volatile matter content of the ribbon-shaped resin (MMA: methyl methacrylic acid) was measured under the following conditions using a hydrogen flame ionization detector GC/FID and a gas chromatograph GC-2010 manufactured by SHIMADZU CORPORATION.

Column: Rtx-1 manufactured by SHIMADZU GLC Ltd. Material: fused silica, Liquid phase: chemically-bonded 100% dimethylpolysiloxane Preparation of solvent: A solvent obtained by dissolving the ribbon-shaped resin in methylene chloride at a concentration of 1% (10000 ppm) (0.1 g/10 mL) was used.

Injected amount: 1.0 μL

Temperature of vaporizing chamber: 180° C.

Column oven temperature program: The temperature of a column oven was set to 40° C., held at 40° C. for 5 min, increased to 270° C. at a rate of 10° C./min, and held at 270° C. for 30 min for analysis.

(Evaluation of Appearance of Film)

The appearance of a film obtained in each of Examples and Comparative Examples was visually observed and evaluated according to the following criteria:

○: die lines and/or dent defects were not observed; and x: die lines and/or dent defects were observed.

(Imidization Ratio)

An imidization ratio was calculated in the following manner using IR. Pellets of a product were dissolved in methylene chloride to obtain a solution, and the IR spectrum of the solution was measured at room temperature using TravelIR manufactured by SensIR Tecnologies. From the obtained IR spectrum, the absorption intensity of ester carbonyl groups at 1720 $cm^{-1}$ (Absester) and the absorption intensity of imide carbonyl groups at 1660 $cm^{-1}$ (Absimide) were determined, and the ratio between them was determined as an imidization ratio (Im % (IR)). Here, the term "imidization ratio" refers to the ratio of imide carbonyl groups to the total carbonyl groups.

(Glutarimide Unit Content)

A resin was subjected to $^1$H-NMR analysis using $^1$H-NMR BRUKER AvanceIII (400 MHz) to determine the amount of each monomer unit, such as a glutarimide unit or an ester unit, contained in the resin (mol %), and the monomer unit content (mol %) was converted to a monomer unit content (wt %) using the molecular weight of each monomer unit.

(Acid Value)

First, 0.3 g of an obtained glutarimide acrylic resin was dissolved in a mixed solvent of 37.5 mL of methylene chloride and 37.5 m of methanol. Then, 2 drops of a phenolphthalein ethanol solution were added, and then 5 mL of a 0.1 N aqueous sodium hydroxide solution was added. The excess base was titrated with 0.1 N hydrochloric acid, and a difference between the amount of the base added and the amount of hydrochloric acid used for neutralization expressed in milliequivalent was determined as an acid value.

(Refractive Index)

A glutarimide acrylic resin to be measured was processed into a sheet, and the refractive index (nD) of the sheet was measured at a sodium D-line wavelength in accordance with JIS K7142 using an Abbe refractometer 2T manufactured by ATAGO CO., LTD.

(Transparency of Stretched Film)

One or more embodiments of the present invention provide a film having excellent transparency even after stretching. Here, the total light transmittance and haze of a biaxially-stretched film that will be described later are defined as evaluation indicators of the transparency of a stretched film. According to one or more embodiments of the present invention, the haze measured as an evaluation indicator may be 2.0% or less.

(Preparation of Biaxially-Stretched Film and Measurement of Various Physical Properties)

A 13.3 cm×13.3 cm test piece was cut out from an unstretched raw film having a film thickness of 160 μm obtained in each of Examples and Comparative Examples, and was held for 5 minutes at a temperature higher by 15° C. than its glass transition temperature in a state where all the four sides thereof were held. Then, the test piece was stretched twice (also referred to as "stretched 100%") in two axial directions at the same time at a rate of 120 mm/min to obtain a stretched film having a film thickness of 40 μm. Then, the obtained stretched film was cooled to 23° C., and a sample was taken from the central portion of the stretched film. The birefringence (orientation birefringence) of the sample was measured using an automatic birefringence meter (KOBRA-WR manufactured by Oji Scientific Instruments) at a temperature of 23±2° C., a humidity of 50±5%, a wavelength of 590 nm, and an incident angle of 0°. At the same time, the in-plane phase difference Re and the thickness-direction phase difference Rth (incident angle: 40°) of the stretched film were also measured. (The in-plane phase difference and the thickness-direction phase difference Rth have been described above in detail). Further, the total light transmittance and the haze of the stretched film were also measured by the method described above.

(Photoelastic Constant)

A 15 mm×90 mm strip-shaped test piece was cut out from an unstretched film (raw film) having a film thickness of 80 μm or 160 μm obtained in each of Examples and Comparative Examples in the transverse direction (TD) (so that its longitudinal direction is parallel to TD). The birefringence of the test piece was measured using an automatic birefringence meter (KOBRA-WR manufactured by Oji Scientific Instruments) at a temperature of 23±2° C., a humidity of 50±5%, a wavelength of 590 nm, and an incident angle of 0°. One of the long sides of the film was fixed, and in this state, the birefringence of the film was measured while a load applied to the other long side was increased from 0 kgf to 4 kgf by 0.5 kgf-increments. The magnitude of a change in birefringence per unit stress was calculated from the obtained result.

Production Example 1

<Production of Graft Copolymer (B1)>

The following materials were fed into a polymerization apparatus having a capacity of 8 liters and equipped with a stirrer.

| | |
|---|---|
| Deionized water | 180 parts |
| Polyoxyethylene lauryl ether phosphoric acid | 0.002 parts |
| Boric acid | 0.4725 parts |
| Sodium carbonate | 0.04725 parts |
| Sodium hydroxide | 0.0098 parts |

Air in the polymerization apparatus was sufficiently purged with nitrogen gas, and then the temperature in the polymerization apparatus was set to 80° C. Then, 0.027 parts of potassium persulfate was fed as a 2% aqueous solution, and then materials for use in the polymerization stage (I) shown in Table 1 were continuously added for 81 minutes. Further, polymerization was continued for 60 minutes to obtain a polymer (I). The polymerization conversion ratio was 99.0%.

Then, 0.0267 parts of sodium hydroxide was added as a 2% aqueous solution, and 0.08 parts of potassium persulfate was added as a 2% aqueous solution. Then, materials for use in the polymerization stage (II) shown in Table 1 were continuously added for 150 minutes. After the completion of the addition, 0.015 parts of potassium persulfate in terms of pure content was added as a 2% aqueous solution, and polymerization was continued for 120 minutes to obtain a polymer (II). The polymerization conversion ratio was 99.0%, and the average particle diameter was 241 nm.

Then, 0.023 parts of potassium persulfate was added as a 2% aqueous solution. Then, materials for use in the polymerization stage (III) shown in Table 1 were continuously added for 70 minutes, and polymerization was further continued for 60 minutes to obtain a graft copolymer latex. The polymerization conversion ratio was 100.0%. The obtained latex was coagulated by salting out using magnesium sulfate, washed with water, and dried to obtain a white powdery graft copolymer (B1). The graft copolymer (B1) had a gel content of 78% and a graft ratio of 1%.

It is to be noted that the amount of unreacted part of the alkyl mercaptan-based chain transfer agent contained in a latex of the polymer (I) obtained in the polymerization stage (I) was measured using a gas chromatograph (GC-2014 manufactured by SHEVIADZU CORPORATION), and was found to be as small as about 0.01 wt %. From the result, it can be estimated that almost all the alkyl mercaptan-based chain transfer agent added had been converted to a terminal alkylthio group at the time when the polymerization stage (I) was completed.

Production Example 2

<Production of Graft Copolymer (B2)>

The following materials were fed into a polymerization apparatus having a capacity of 8 liters and equipped with a stirrer.

| | |
|---|---|
| Deionized water | 180 parts |
| Polyoxyethylene lauryl ether phosphoric acid | 0.002 parts |
| Boric acid | 0.4725 parts |
| Sodium carbonate | 0.04725 parts |
| Sodium hydroxide | 0.0098 parts |

Air in the polymerization apparatus was sufficiently purged with nitrogen gas, and then the temperature in the polymerization apparatus was set to 80° C. Then, 0.027 parts of potassium persulfate was fed as a 2% aqueous solution, and then materials for use in the polymerization stage (I) shown in Table 1 were continuously added for 81 minutes. Further, polymerization was continued for 60 minutes to obtain a polymer (I). The polymerization conversion ratio was 99.0%.

Then, 0.0267 parts of sodium hydroxide was added as a 2% aqueous solution, and 0.08 parts of potassium persulfate was added as a 2% aqueous solution. Then, materials for use in the polymerization stage (II) shown in Table 1 were continuously added for 150 minutes. After the completion of addition, 0.015 parts of potassium persulfate was added as a 2% aqueous solution, and polymerization was continued for 120 minutes to obtain a polymer (II). The polymerization conversion ratio was 99.0%, and the average particle diameter was 236 nm.

Then, 0.023 parts of potassium persulfate was added as a 2% aqueous solution. Then, materials for use in the polymerization stage (III) shown in Table 1 were continuously added for 45 minutes, and polymerization was further continued for 30 minutes.

Then, materials for use in the polymerization stage (IV) shown in Table 1 were continuously added for 25 minutes, and polymerization was further continued for 60 minutes to obtain a graft copolymer latex. The polymerization conversion ratio was 100.0%. The obtained latex was coagulated by salting out using magnesium sulfate, washed with water, and dried to obtain a white powdery graft copolymer (B2). The graft copolymer (B2) had a gel content of 66% and a graft ratio of −14%.

Production Example 3

<Production of Graft Copolymer (B3)>

The following materials were fed into a polymerization apparatus having a capacity of 8 liters and equipped with a stirrer.

| | |
|---|---|
| Deionized water | 180 parts |
| Polyoxyethylene lauryl ether phosphoric acid | 0.0031 parts |
| Boric acid | 0.4725 parts |
| Sodium carbonate | 0.04725 parts |
| Sodium hydroxide | 0.0098 parts |

Air in the polymerization apparatus was sufficiently purged with nitrogen gas, and then the temperature in the polymerization apparatus was set to 80° C. Then, 0.081 parts of potassium persulfate was fed as a 2% aqueous solution, and then materials for use in the polymerization stage (I) shown in Table 1 were continuously added for 81 minutes. Further, polymerization was continued for 60 minutes to obtain a polymer (I). The polymerization conversion ratio was 99.0%.

Then, 0.0267 parts of sodium hydroxide was added as a 2% aqueous solution, and 0.08 parts of potassium persulfate was added as a 2% aqueous solution. Then, materials for use in the polymerization stage (II) shown in Table 1 were continuously added for 150 minutes. After the completion of addition, 0.015 parts of potassium persulfate was added as a 2% aqueous solution, and polymerization was continued for 120 minutes to obtain a polymer (II). The polymerization conversion ratio was 99.0%, and the average particle diameter was 211 nm.

Then, 0.023 parts of potassium persulfate was added as a 2% aqueous solution. Then, materials for use in the polymerization stage (III) shown in Table 1 were continuously added for 70 minutes, and polymerization was further continued for 60 minutes to obtain a graft copolymer latex. The polymerization conversion ratio was 100.0%. The obtained latex was coagulated by salting out using magnesium sulfate, washed with water, and dried to obtain a white powdery graft copolymer (B3). The graft copolymer (B3) had a gel content of 80% and a graft ratio of 4%.

Production Example 4

<Production of Graft Copolymer (B4)>

The following materials were fed into a polymerization apparatus having a capacity of 8 liters and equipped with a stirrer.

| | |
|---|---|
| Deionized water | 180 parts |
| Polyoxyethylene lauryl ether phosphoric acid | 0.0031 parts |
| Boric acid | 0.4725 parts |
| Sodium carbonate | 0.04725 parts |
| Sodium hydroxide | 0.0098 parts |

Air in the polymerization apparatus was sufficiently purged with nitrogen gas, and then the temperature in the polymerization apparatus was set to 80° C. Then, 0.107 parts of potassium persulfate was added as a 2% aqueous solution, and then materials for use in the polymerization stage (I) shown in Table 1 were continuously added for 81 minutes. Further, polymerization was continued for 60 minutes to obtain a polymer (I). The polymerization conversion ratio was 99.0%.

Then, 0.0267 parts of sodium hydroxide was added as a 2% aqueous solution. Then, materials for use in the polymerization stage (II) shown in Table 1 were continuously added for 150 minutes. After the completion of addition, 0.015 parts of potassium persulfate was added as a 2% aqueous solution, and polymerization was continued for 120 minutes to obtain a polymer (II). The polymerization conversion ratio was 99.0%, and the average particle diameter was 210 nm.

Then, 0.023 parts of potassium persulfate was added as a 2% aqueous solution. Then, materials for use in the polymerization stage (III) shown in Table 1 were continuously added for 70 minutes, and polymerization was further continued for 60 minutes to obtain a graft copolymer latex. The polymerization conversion ratio was 100.0%. The obtained latex was coagulated by salting out using magnesium sulfate, washed with water, and dried to obtain a white powdery graft copolymer (B4). The graft copolymer (B4) had a gel content of 79% and a graft ratio of 2%.

Production Example 5

<Production of Graft Copolymer (B5)>

The following materials were fed into a polymerization apparatus having a capacity of 8 liters and equipped with a stirrer.

| | |
|---|---|
| Deionized water | 180 parts |
| Polyoxyethylene lauryl ether phosphoric acid | 0.002 parts |
| Boric acid | 0.4725 parts |
| Sodium carbonate | 0.04725 parts |
| Sodium hydroxide | 0.0098 parts |

Air in the polymerization apparatus was sufficiently purged with nitrogen gas, and then the temperature in the polymerization apparatus was set to 80° C. Then, 0.027 parts of potassium persulfate was fed, and then materials for use in the polymerization stage (I) shown in Table 1 were continuously added for 81 minutes. Further, polymerization was continued for 60 minutes to obtain a polymer (I). The polymerization conversion ratio was 96.3%.

Then, 0.027 parts of sodium hydroxide was added, and 0.08 parts of potassium persulfate was added. Then, materials for use in the polymerization stage (II) shown in Table 1 were continuously added for 150 minutes. After the completion of addition, 0.015 parts of potassium persulfate in terms of pure content was added, and polymerization was continued for 120 minutes to obtain a polymer (II). The polymerization conversion ratio was 99.2%, and the average particle diameter was 217 nm.

Then, 0.023 parts of potassium persulfate was added. Then, materials for use in the polymerization stage (III) shown in Table 1 were continuously added for 70 minutes, and polymerization was further continued for 60 minutes to obtain a graft copolymer latex. The polymerization conversion ratio was 99.9%. The obtained latex was coagulated by salting out using magnesium sulfate, washed with water, and dried to obtain a white powdery graft copolymer (B5). The graft copolymer (B5) had a gel content of 76% and a graft ratio of −1%.

Production Example 6

<Production of Graft Copolymer (B6)>

The following materials were fed into a polymerization apparatus having a capacity of 8 liters and equipped with a stirrer.

| | |
|---|---|
| Deionized water | 175 parts |
| Polyoxyethylene lauryl ether phosphoric acid | 0.0104 parts |
| Boric acid | 0.4725 parts |
| Sodium carbonate | 0.04725 parts |

Air in the polymerization apparatus was sufficiently purged with nitrogen gas, and then the temperature in the polymerization apparatus was set to 80° C. Then, 26% of materials for use in the polymerization stage (I) shown in Table 1 were added to the polymerization apparatus at a time. Then, 0.0645 parts of sodium formaldehyde sulfoxylate, 0.0056 parts of disodium ethylenediamine tetraacetate, 0.0014 parts of ferrous sulfate, and 0.0207 parts of t-butyl hydroperoxide were added. After 15 minutes, 0.0345 parts of t-butyl hydroperoxide was added, and polymerization was further continued for 15 minutes. Then, 0.0098 parts of sodium hydroxide was added as a 2% aqueous solution, 0.0852 parts of polyoxyethylene lauryl ether phosphoric acid was added, and the remaining 74% of the materials for use in the polymerization stage (I) were continuously added for 60 minutes. After 30 minutes from the completion of addition, 0.069 parts of t-butyl hydroperoxide was added, and polymerization was further continued for 30 minutes to obtain a polymer (I). The polymerization conversion ratio was 100.0%.

Then, 0.0267 parts of sodium hydroxide was added as a 2% aqueous solution, and 0.08 parts of potassium persulfate was added as a 2% aqueous solution. Then, materials for use in the polymerization stage (II) shown in Table 1 were continuously added for 150 minutes. After the completion of addition, 0.015 parts of potassium persulfate was added as a 2% aqueous solution, and polymerization was continued for 120 minutes to obtain a polymer (II). The polymerization conversion ratio was 99.0%, and the average particle diameter was 225 nm.

Then, 0.023 parts of potassium persulfate was added as a 2% aqueous solution. Then, materials for use in the polymerization stage (III) shown in Table 1 were continuously added for 45 minutes, and polymerization was further continued for 30 minutes.

Then, materials for use in the polymerization stage (IV) shown in Table 1 were continuously added for 25 minutes, and polymerization was further continued for 60 minutes to obtain a graft copolymer latex. The polymerization conversion ratio was 100.0%. The obtained latex was coagulated by salting out using magnesium chloride, washed with water, and dried to obtain a white powdery graft copolymer (B6). The graft copolymer (B6) had a gel content of 96% and a graft ratio of 24%.

Production Example 7

<Production of Graft Copolymer (B7)>

The following materials were fed into a polymerization apparatus having a capacity of 8 liters and equipped with a stirrer.

| | |
|---|---|
| Deionized water | 180 parts |
| Polyoxyethylene lauryl ether phosphoric acid | 0.0051 parts |
| Boric acid | 0.4725 parts |
| Sodium carbonate | 0.04725 parts |
| Sodium hydroxide | 0.0098 parts |

Air in the polymerization apparatus was sufficiently purged with nitrogen gas, and then the temperature in the polymerization apparatus was set to 80° C. Then, 0.3 parts of potassium persulfate was fed as a 2% aqueous solution, and then materials for use in the polymerization stage (I) shown in Table 1 were continuously added for 81 minutes. Further, polymerization was continued for 60 minutes to obtain a polymer (I). The polymerization conversion ratio was 97.9%.

Then, 0.0267 parts of sodium hydroxide was added as a 2% aqueous solution. Then, materials for use in the polymerization stage (II) shown in Table 1 were continuously added for 150 minutes. After the completion of addition, polymerization was continued for 120 minutes to obtain a polymer (II). The polymerization conversion ratio was 100.0%, and the average particle diameter was 175 nm.

Then, materials for use in the polymerization stage (III) shown in Table 1 were continuously added for 70 minutes, and polymerization was further continued for 60 minutes to obtain a graft copolymer latex. The polymerization conversion ratio was 100.0%. The obtained latex was coagulated by salting out using magnesium sulfate, washed with water, and dried to obtain a white powdery graft copolymer (B7). The graft copolymer (B7) had a gel content of 91% and a graft ratio of 21%.

Production Example 8

<Production of Graft Copolymer (B8)>

The following materials were fed into a polymerization apparatus having a capacity of 8 liters and equipped with a stirrer.

| | |
|---|---|
| Deionized water | 180 parts |
| Polyoxyethylene lauryl ether phosphoric acid | 0.031 parts |
| Boric acid | 0.4725 parts |
| Sodium carbonate | 0.04725 parts |
| Sodium hydroxide | 0.0098 parts |

Air in the polymerization apparatus was sufficiently purged with nitrogen gas, and then the temperature in the polymerization apparatus was set to 80° C. Then, 0.027 parts of potassium persulfate was fed as a 2% aqueous solution, and then materials for use in the polymerization stage (I) shown in Table 1 were continuously added for 81 minutes. Further, polymerization was continued for 60 minutes to obtain a polymer (I). The polymerization conversion ratio was 99.0%.

Then, 0.0267 parts of sodium hydroxide was added as a 2% aqueous solution, and 0.08 parts of potassium persulfate was added as a 2% aqueous solution. Then, materials for use in the polymerization stage (II) shown in Table 1 were continuously added for 150 minutes. After the completion of addition, 0.015 parts of potassium persulfate was added as a 2% aqueous solution, and polymerization was continued for 120 minutes to obtain a polymer (II). The polymerization conversion ratio was 99.0%, and the average particle diameter was 221 nm.

Then, 0.023 parts of potassium persulfate was added as a 2% aqueous solution. Then, materials for use in the polymerization stage (III) shown in Table 1 were continuously added for 45 minutes, and polymerization was further continued for 30 minutes.

Then, materials for use in the polymerization stage (IV) shown in Table 1 were continuously added for 25 minutes, and polymerization was further continued for 60 minutes to obtain a graft copolymer latex. The polymerization conversion ratio was 100.0%. The obtained latex was coagulated by salting out using magnesium sulfate, washed with water, and dried to obtain a white powdery graft copolymer (B8). The graft copolymer (B8) had a gel content of 79% and a graft ratio of 3.1%.

It is to be noted that the amount of unreacted part of the alkyl mercaptan-based chain transfer agent contained in a latex of the polymer (I) obtained in the polymerization stage (I) was measured using a gas chromatograph (GC-2014 manufactured by SHEVIADZU CORPORATION), and was found to be as small as about 0.01 wt %. From the result, it can be estimated that almost all the alkyl mercaptan-based chain transfer agent added had been converted to a terminal alkylthio group at the time when the polymerization stage (I) was completed.

TABLE 1

| | Graft copolymer (B) | B1 | B2 | B3 | B4 | B5 | B6 | B7 | B8 |
|---|---|---|---|---|---|---|---|---|---|
| Polymerization stage (I) | Amount of monomer mixture (a) per 100 parts of total amount of monomers of (B) (parts) | 27 | 27 | 27 | 27 | 27 | 27 | 25 | 27 |
| | Methyl methacrylate (%) | 93.2 | 97 | 93.2 | 93.2 | 97 | 97 | 92 | 93.2 |
| | Butyl acrylate (%) | 6 | 3 | 6 | 6 | 3 | 3 | 8 | 6 |
| | Styrene (%) | 0.8 | | 0.8 | 0.8 | | | | 0.8 |
| | Amount of allyl methacrylate per 100 parts of total amount of monomers of (B) (parts) | 0.135 | 0.135 | 0.135 | 0.135 | 0.135 | 0.135 | 0.03 | 0.135 |
| | Amount of n-OM per 100 parts of total amount of monomers of (B) (parts) | 0.3 | 0.3 | 0.3 | 0.3 | | | | 0.3 |
| | Amount of s-BM per 100 parts of total amount of monomers of (B) (parts) | | | | | 0.3 | | | |
| | Amount of t-DM per 100 parts of total amount of monomers of (B) (parts) | | | | | | 0.1 | | |
| | Amount of polyoxyethylene lauryl ether phosphoric acid per 100 parts of total amount of monomers of (B) (parts) | 0.0936 | 0.0936 | 0.0934 | 0.0934 | 0.0934 | | 0.0934 | 0.0934 |
| Polymerization stage (II) | Amount of monomer mixture (b) per 100 parts of total amount of monomers of (B) (parts) | 50 | 50 | 50 | 50 | 50 | 50 | 50 | 50 |
| | Butyl acrylate (%) | 82 | 82 | 82 | 82 | 82 | 82 | 82 | 82 |
| | Styrene (%) | 18 | 18 | 18 | 18 | 18 | 18 | 18 | 18 |
| | Amount of allyl methacrylate per 100 parts of total amount of monomers of (B) (parts) | 0.75 | 0.75 | 0.75 | 0.75 | 0.75 | 0.75 | 1 | 0.75 |
| | Amount of polyoxyethylene lauryl ether phosphoric acid per 100 parts of total amount of monomers of (B) (parts) | 0.2328 | 0.2328 | 0.2328 | 0.2328 | 0.2328 | 0.2328 | 0.2328 | 0.2328 |
| Average particle diameter at the end of polymerization stage (II) (nm) | | 241 | 236 | 211 | 210 | 217 | 225 | 175 | 221 |
| Polymerization stage(III) | Amount of monomer mixture (c) per 100 parts (B) (parts) | 23 | 15 | 23 | 23 | 23 | 15 | 25 | 15 |
| | Methyl methacrylate (%) | 80 | 95 | 80 | 80 | 80 | 95 | 88 | 95 |
| | Butyl acrylate (%) | 20 | 5 | 20 | 20 | 20 | 5 | 12 | 5 |
| | Amount of n-OM per 100 parts of total amount of monomers of (B) (parts) | | 0.18 | | | | | 0.05 | |
| Polymerization stage (IV) | Amount of monomer mixture (d) per 100 parts of total amount of monomers of (B) (parts) | | 8 | | | | 8 | | 8 |
| | Methyl methacrylate (%) | | 52 | | | | 52 | | 52 |
| | Butyl acrylate (%) | | 48 | | | | 48 | | 48 |
| | Amount of n-OM per 100 parts of total amount of monomers of (B) (parts) | | 0.096 | | | | | | |
| Chain transfer agent | Type | n-OM | n-OM | n-OM | n-OM | s-BM | t-DM | n-OM | n-OM |
| | Total amount per 100 parts of total amount of monomers of (B) (parts) | 0.3 | 0.576 | 0.3 | 0.3 | 0.3 | 0.1 | 0.05 | 0.3 |
| | Total amount used in (III) and (IV) (parts) | 0 | 0.276 | 0 | 0 | 0 | 0 | 0.05 | 0 |
| | Amount per 100 parts of monomers used in (III) and (TV) (parts) | 0 | 1.2 | 0 | 0 | 0 | 0 | 0.2 | 0 |
| Initiator | Type | KPS | KPS | KPS | KPS | KPS | BHPO/KPS | KPS | KPS |
| | Initiator used in polymerization stage (I) | KPS | KPS | KPS | KPS | KPS | BHPO | KPS | KPS |
| | Total amount of KPS per 100 parts of total amount of monomers of (B) (parts) | 0.145 | 0.145 | 0.199 | 0.145 | 0.145 | 0.118 | 0.3 | 0.145 |

TABLE 1-continued

| Graft copolymer (B) | B1 | B2 | B3 | B4 | B5 | B6 | B7 | B8 |
|---|---|---|---|---|---|---|---|---|
| Amount of KPS in polymerization stage (I) | 0.027 | 0.027 | 0.081 | 0.107 | 0.027 | 0 | 0.3 | 0.027 |
| Amount of KPS per 100 parts of monomer mixture (a) (parts) | 0.10 | 0.10 | 0.30 | 0.40 | 0.10 | 0.00 | 1.20 | 0.10 |
| Gel content (%) | 78 | 66 | 80 | 79 | 76 | 96 | 91 | 79 |
| Graft ratio (%) | 1 | −14 | 4 | 2 | −1 | 24 | 21 | 3.1 |

KPS: potassium persulfate
BHPO: t-butyl hydroperoxide
n-OM: n-octyl mercaptan
s-BM: s-butyl mercaptan
t-DM: t-dodecyl mercaptan (Evaluation of Thermal Stability of Graft Copolymer)

The thermal stability of each of the graft copolymers (B1) to (B8) obtained in Production Examples 1 to 8 was evaluated in the above-described manner. The results are shown in Table 2.

TABLE 2

| | Weight loss temperature (° C.) | B1 | B2 | B3 | B4 | B5 | B6 | B7 | B8 |
|---|---|---|---|---|---|---|---|---|---|
| Thermal stability evaluation TGA | 1% | 296 | 293 | 275 | 282 | 273 | 248 | 271 | 287 |
| | 2% | 316 | 315 | 293 | 302 | 293 | 268 | 289 | 309 |
| | 3% | 328 | 327 | 308 | 318 | 307 | 279 | 300 | 323 |
| | 4% | 335 | 334 | 320 | 328 | 320 | 286 | 312 | 331 |
| | 5% | 340 | 339 | 327 | 334 | 328 | 293 | 321 | 337 |

Examples 1 to 5, Comparative Examples 1 and 2

<Preparation of Molded Article>

Each of the graft copolymers (B1) to (B7) obtained in Production Examples 1 to 7 and an acrylic resin (A1) (PMMA resin, SUMIPEX LG (manufactured by Sumitomo Chemical Company, Limited)) were extrusion kneaded at a ratio shown in Table 3 using a vent-equipped single screw extruder (HW-40-28: 40 m/m, L/D=28, manufactured by TABATA Industrial Machinery Co., Ltd.) at a preset temperature of C1 to C3 of 210° C., a preset temperature of C4 of 220° C., a preset temperature of C5 of 230° C., and a preset temperature of D of 240° C., and pelletized to obtain pellets.

The obtained pellets were dried at 90° C. for 3 hours or longer and then subjected to injection molding using an injection molding machine (160MSP-10 manufactured by Mitsubishi Heavy Industries, Ltd.) at a cylinder temperature T3 of 230° C., a cylinder temperature T2 of 240° C., and a cylinder temperature T1 of 250° C., a nozzle temperature N of 255° C., an injection speed of 19.7%, and a mold temperature of 60° C. to obtain a flat plate sample having a thickness of 3 mm and a size of 15 cm×10 cm. The total light transmittance, haze, and transparent YI of the obtained flat plate sample were measured as indicators of transparency and color.

Further, ¼-inch test pieces and dumbbell-shaped test pieces according to ASTM D638-1 were prepared at the same injection molding temperature to measure impact resistance (Izod), HDT and to perform a tensile test. The results are shown in Table 3. Further, the MFR was measured using the pellets.

TABLE 3

| | Acrylic resin | Graft copolymer | Tensile elongation (%) | Izod (kJ/m2) | Total light transmittance (%) | Haze (%) | Transparent YI | MFR (g/10 min) | HDT (° C.) |
|---|---|---|---|---|---|---|---|---|---|
| Example 1 | A1 (60%) | B1 (40%) | 81.0 | 7.0 | 91.2 | 1.15 | −0.08 | 3.1 | 85.2 |
| Example 2 | A1 (60%) | B2 (40%) | 75.0 | 3.5 | 90.8 | 1.58 | −0.52 | 4.9 | 86.8 |
| Example 3 | A1 (60%) | B3 (40%) | — | 5.8 | 91.1 | 0.89 | 0.39 | 3.4 | 84.4 |
| Example 4 | A1 (60%) | B4 (40%) | — | 5.8 | 91.3 | 0.88 | 0.22 | 3.7 | 87.0 |
| Example 5 | A1 (60%) | B5 (40%) | 74.2 | 6.3 | 91.1 | 0.99 | 0.27 | 4.1 | 85.3 |
| Comparative Example 1 | A1 (60%) | B6 (40%) | 83.0 | 6.7 | 91.3 | 1.18 | 0.61 | 1.9 | 85.7 |
| Comparative Example 2 | A1 (60%) | B7 (40%) | 79.0 | 4.9 | 91.6 | 0.6 | 0.98 | 2.6 | 84.9 |

It is found that the molded articles obtained in Examples 1 to 5 have a lower transparent YI value than the molded articles obtained in Comparative Examples 1 and 2, and are therefore excellent in color. Further, it is found that the molded articles obtained in Examples 1, 3, 4, and 5 have a large Izod value as an indicator of impact resistance, and are therefore excellent in impact resistance. Among them, the molded article obtained in Example 1 is most excellent in both impact resistance and color.

Example 6 and Comparative Example 3

A single screw extruder having a full-flight screw with a diameter of 40 mm was used, and the temperature of temperature control zone of the extruder was set to 255° C. and the screw rotation speed of the extruder was set to 52 rpm. A mixture of an acrylic resin (A) and a graft copolymer (B) shown in Table 4 was supplied at a rate of 10 kg/hr. A resin composition extruded as a strand through a die provided at the outlet of the extruder was cooled in a water tank and pelletized by a pelletizer to obtain pellets.

The obtained pellets were supplied at a rate of 10 kg/hr to a single screw extruder equipped with a leaf disc filter having an opening size of 5 μm and a T-die connected to the outlet thereof. The temperature control zone temperature of the extruder was set to 260° C., and the screw rotation speed of the extruder was set to 20 rpm. The pellets were melt extruded through the extruder to obtain a film having a film thickness of 80 μm. Various physical properties of the film were measured by the above-described methods and evaluated.

TABLE 4

| | | | Example 6 | Comparative Example 3 |
|---|---|---|---|---|
| Acrylic resin (A) | | Type | A2 | A2 |
| | | (parts) | 80 | 80 |
| Graft copolymer (B) | | Type | B8 | B6 |
| | | (parts) | 20 | 20 |
| Physical properties of film | Film thickness | (μm) | 80 | 80 |
| | Glass transition temperature (DSC) | (° C.) | 110 | 110 |
| | Total light transmittance | (%) | 92.4 | 92.5 |
| | Haze value | (%) | 0.94 | 1.71 |
| | Inner haze value | (%) | 0.36 | 0.44 |
| | MIT | (times) | 86 | 120 |
| | Re | nm | 1.5 | 0.8 |
| | Rth | nm | −4.7 | −6.7 |
| | Evaluation of appearance of film | | ○ | X |
| | Residual volatile matter content of resin composition | ppm | 7835 | 10080 |

A2: SUMIPEX MH-TZ manufactured by Sumitomo Chemical Company, Limited

Production Example 9

<Production of Glutarimide Acrylic Resin (A3)>

A glutarimide acrylic resin (A3) was produced using poly(methylmethacrylate) as a raw material resin and monomethylamine as an imidization agent In Production Example 9, a tandem-type reactive extruder was used, in which two extrusion reactors were arranged in series.

The tandem-type reactive extruder had a first extruder and a second extruder, and both the extruders were intermeshing co-rotating twin screw extruders having a diameter of 75 mm and an L/D ratio (ratio of length (L) to diameter (D) of extruder) of 74. The raw material resin was supplied through the raw material supply port of the first extruder using a loss-in-weight feeder (manufactured by Kubota Corporation).

The pressure in each of the vents of the first and second extruders was reduced to about −0.090 MPa. Further, the first extruder was connected to the second extruder through a pipe having a diameter of 38 mm and a length of 2 m, and a constant flow pressure valve was used as a system for controlling the pressure in a part connecting the resin discharge port of the first extruder to the raw material supply port of the second extruder.

The resin (strand) discharged from the second extruder was cooled on a cooling conveyor and cut into pellets by a pelletizer. In order to adjust the pressure in the part connecting the resin discharge port of the first extruder and the raw material supply port of the second extruder or to detect unstable extrusion, resin-pressure meters were provided at the discharge port of the first extruder, the center of the part connecting the first and second extruders, and the discharge port of the second extruder.

In the first extruder, an imide resin intermediate 1 was produced using a polymethyl methacrylate resin (Mw: 105000) as a raw material resin and monomethylamine as an imidization agent. At this time, the temperature of maximum temperature portion of the extruder was 280° C., the screw rotation speed of the extruder was 55 rpm, the supply rate of the raw material resin was 150 kg/hr, and the amount of monomethylamine added was 2.0 parts with respect to 100 parts of the raw material resin. The constant flow pressure valve was provided just before the raw material supply port of the second extruder to adjust the pressure in the monomethylamine injection portion of the first extruder to 8 MPa.

In the second extruder, the remaining imidization agent and a by-product were devolatilized through a rear vent and a vacuum vent, and then dimethyl carbonate was added as an esterification agent to produce an imide resin intermediate 2. At this time, the temperature of each barrel of the extruder was 260° C., the screw rotation speed of the extruder was 55 rpm, and the amount of dimethyl carbonate added was 3.2 parts with respect to 100 parts of the raw material resin. Further, the esterification agent was removed through a vent, and then the resin was extruded through a strand die, cooled in a water tank, and pelletized by a pelletizer to obtain a glutarimide acrylic resin (A3).

The obtained glutarimide acrylic resin (A3) is an acrylic resin obtained by copolymerization of a glutarimide unit represented by the general formula (1) and a (meth)acrylate ester unit represented by the general formula (2).

The imidization ratio, glutarimide unit content, acid value, glass transition temperature, and refractive index of the glutarimide acrylic resin (A3) were measured by the above-described methods. As a result, the glutarimide acrylic resin (A3) had an imidization ratio of 13%, a glutarimide unit content of 7 wt %, an acid value of 0.4 mmol/g, a glass transition temperature of 130° C., and a refractive index of 1.50.

Examples 7 and 8, Comparative Example 4

A single screw extruder having a full-flight screw with a diameter of 40 mm was used, and the temperature of temperature control zone of the extruder was set to 255° C. and the screw rotation speed of the extruder was set to 52 rpm. A mixture of an acrylic resin (A) and a graft copolymer (B) shown in Table 5 was supplied at a rate of 10 kg/hr. A resin composition extruded as a strand through a die provided at the outlet of the extruder was cooled in a water tank and pelletized by a pelletizer to obtain pellets.

The obtained pellets were supplied at a rate of 10 kg/hr to a single screw extruder equipped with a leaf disc filter having an opening size of 5 μm and a T-die connected to the outlet thereof. The temperature control zone temperature of the extruder was set to 260° C., and the screw rotation speed of the extruder was set to 20 rpm. The pellets were melt extruded through the extruder to obtain a film having a film thickness (80 μm or 160 μm) shown in Table 5. Various physical properties of the film were measured by the above-described methods and evaluated.

unit, and 0 to 10 parts by weight of a polyfunctional monomer unit per 100 parts by weight of a total amount of (c-1) and (c-2), wherein at least a part of the first hard polymer is coated with the soft polymer, wherein the second hard polymer is grafted on the first hard polymer and/or the soft polymer, and wherein the first hard polymer has a primary alkylthio group and/or a secondary alkylthio group.

2. The resin composition according to claim 1, wherein the first hard polymer has the primary alkylthio group.

3. The resin composition according to claim 1, wherein the first hard polymer has an n-octylthio group.

TABLE 5

| | | | Example 7 | | Example 8 | | Comparative Example 4 | |
|---|---|---|---|---|---|---|---|---|
| | Acrylic resin(A) | Type | A3 | | A3 | | A3 | |
| | | (parts) | 80 | | 80 | | 80 | |
| | Graft copolymer (B) | Type | B1 | | B8 | | B6 | |
| | | (parts) | 20 | | 20 | | 20 | |
| Physical properties of film | Stretching | | Unstretched | Stretched | Unstretched | Stretched | Unstretched | Stretched |
| | Film thickness | (μm) | 80 | 40 | 80 | 40 | 80 | 40 |
| | Glass transition temperature (DSC) | (° C.) | 122 | 122 | 122 | 122 | 122 | 122 |
| | Total light transmittance | (%) | 92.4 | 92.4 | 92.4 | 92.4 | 92.4 | 92.4 |
| | Haze value | (%) | 1.25 | 0.94 | 1.52 | 0.20 | 1.54 | 0.37 |
| | Inner haze value | (%) | 0.49 | 0.25 | 0.68 | 0.16 | 0.61 | 0.23 |
| | MIT | (times) | 117 | 1240 | 110 | 1250 | 97 | 1385 |
| | Orientation birefringence | $\times 10^{-4}$ | 0.1 | 0.13 | 0.1 | 0.13 | 0.08 | 0.25 |
| | Re | nm | 0.64 | 0.52 | 0.34 | 0.55 | 0.72 | 0.98 |
| | Rth | nm | −2.3 | 9.24 | −2.9 | 3.6 | −1.2 | 3.04 |
| | Photoelastic constant | $\times 10^{-12}$ Pa$^{-1}$ | −4.52 | −4.52 | −4.60 | −4.60 | −4.72 | −4.72 |
| | Evaluation of appearance of film | | ○ | ○ | ○ | ○ | X | X |
| | Residual volatile matter content of resin composition | ppm | 600 | | 600 | | 1000 | |

Although the disclosure has been described with respect to only a limited number of embodiments, those skilled in the art, having benefit of this disclosure, will appreciate that various other embodiments may be devised without departing from the scope of the present invention. Accordingly, the scope of the present invention should be limited only by the attached claims.

What is claimed is:

1. A resin composition comprising:

an acrylic resin; and a graft copolymer having a gel content of 65 to 84%, wherein the graft copolymer comprises:

a first hard polymer comprising 40 to 100 wt % of a methacrylate ester unit (a-1), 60 to 0 wt % of a monomer unit (a-2) having a double bond copolymerizable with the methacrylate ester unit, and 0.01 to 10 parts by weight of a polyfunctional monomer unit per 100 parts by weight of a total amount of (a-1) and (a-2), a soft polymer comprising 60 to 100 wt % of an acrylate ester unit (b-1), 0 to 40 wt % of a monomer unit (b-2) having a double bond copolymerizable with the acrylate ester unit, and 0.1 to 5 parts by weight of a polyfunctional monomer unit per 100 parts by weight of a total amount of (b-1) and (b-2); and a second hard polymer comprising 60 to 100 wt % of a methacrylate ester unit (c-1), 40 to 0 wt % of a monomer unit (c-2) having a double bond copolymerizable with the methacrylate ester

4. The resin composition according to claim 1, wherein the first hard polymer comprises 40 to 99.9 wt % of the methacrylate ester unit (a-1), and wherein the monomer unit (a-2) comprises 0.1 to 35 wt % of an acrylate ester unit (a-21), 0 to 10 w % of an aromatic vinyl monomer unit (a-22), and 0 to 15 wt % of a monomer unit (a-23) having a copolymerizable double bond.

5. The resin composition according to claim 1, further comprising a light diffusing agent.

6. The resin composition according to claim 1, wherein the graft copolymer has a 1% weight loss temperature of 270° C. or higher as measured by TGA and a 5% weight loss temperature of 310° C. or higher as measured by TGA.

7. The resin composition according to claim 1, wherein the acrylic resin has a glass transition temperature of 115° C. or higher.

8. The resin composition according to claim 1, wherein the acrylic resin comprises at least one selected from the group consisting of a glutarimide acrylic resin, a maleimide acrylic resin, a partially-hydrogenated styrene unit-containing acrylic polymer, an acrylic polymer having a cyclic acid anhydride structure, an acrylic polymer comprising 97 to 100 wt % of methyl methacrylate and 3 to 0 wt % of methyl acrylate, and an acrylic polymer comprising a hydroxyl group and/or a carboxyl group.

9. The resin composition according to claim 1, wherein the resin composition has a sea-island structure in which the graft copolymer is dispersed as islands in the acrylic resin, the islands having an average particle diameter of 50 to 400 nm.

10. The resin composition according to claim 1, which comprises 40 to 98 parts by weight of the acrylic resin and 60 to 2 parts by weight of the graft copolymer per 100 parts by weight of a total amount of the acrylic resin and the graft copolymer.

11. The resin composition according to claim 1, wherein the resin composition has an YI value of 0.50 or less when the resin composition is converted to a molded article having a thickness of 3 mm.

12. The resin composition according to claim 1, wherein the resin composition has an Izod impact strength of 3.0 $kJ/m^2$ or more.

13. A molded article comprising the resin composition according to claim 1.

14. The molded article according to claim 1, wherein the molded article is an injection molded article.

15. An acrylic resin film obtained by molding the resin composition according to claim 1.

16. The acrylic resin film according to claim 15, wherein the acrylic resin film has a thickness of 10 to 500 μm.

17. The acrylic resin film according to claim 15, wherein the acrylic resin film is an optical film.

18. An optical member comprising the acrylic resin film according to claim 15.

19. A laminate comprising:

a base material; and the acrylic resin film according to claim 15, wherein the acrylic resin film is laminated on the base material.

* * * * *